United States Patent [19]
Rennison et al.

[11] Patent Number: 6,154,213
[45] Date of Patent: Nov. 28, 2000

[54] IMMERSIVE MOVEMENT-BASED INTERACTION WITH LARGE COMPLEX INFORMATION STRUCTURES

[76] Inventors: Earl F. Rennison, 1076 De Haro St., San Francisco, Calif. 94107; Lisa S. Strausfeld, 2355 Polk St., San Francisco, Calif. 94109; Damon M. Horowitz, 130 Frederick St., #106, San Francisco, Calif. 94117

[21] Appl. No.: 09/087,259

[22] Filed: May 29, 1998

Related U.S. Application Data

[60] Provisional application No. 60/048,150, May 30, 1997.

[51] Int. Cl.$^7$ ................................................. G06F 3/14
[52] U.S. Cl. .................. 345/356; 345/357; 345/334; 345/349; 345/428; 345/333; 707/103; 707/104; 707/501
[58] Field of Search ..................... 345/356, 353, 345/357, 348, 349, 333, 334, 428; 707/103, 104, 501, 514

[56] References Cited

U.S. PATENT DOCUMENTS

| | | | |
|---|---|---|---|
| 5,008,853 | 4/1991 | Bly et al. | 345/331 |
| 5,062,060 | 10/1991 | Kolnick | 345/339 |
| 5,241,671 | 8/1993 | Reed et al. | 707/104 |
| 5,481,666 | 1/1996 | Nguyen et al. | 345/357 |
| 5,537,526 | 7/1996 | Anderson et al. | 707/515 |
| 5,544,302 | 8/1996 | Nguyen | 345/348 |
| 5,550,563 | 8/1996 | Matheny et al. | 345/348 |
| 5,557,722 | 9/1996 | Derose et al. | 345/357 |
| 5,584,035 | 12/1996 | Duggan et al. | 345/339 |
| 5,623,589 | 4/1997 | Needham et al. | 707/501 |
| 5,675,752 | 10/1997 | Scott et al. | 345/352 |
| 5,721,851 | 2/1998 | Cline et al. | 345/357 |
| 5,832,494 | 11/1998 | Egger et al. | 707/104 |
| 5,877,766 | 3/1999 | Bates et al. | 345/357 |
| 5,978,811 | 11/1999 | Smiley | 707/104 |

*Primary Examiner*—Raymond J. Bayerl
*Assistant Examiner*—Thomas T. Nguyen
*Attorney, Agent, or Firm*—Fenwick & West LLP

[57] ABSTRACT

An intuitive, immersive, movement-based interface and system provides for navigating through large collections of multidimensional information. The interface allows users to navigate through large document collections by maintaining a constant density of visual information presented on a display device to the user at any given moment of time. The document collection is organized in an immersive information space, containing various levels of topics and related documents. At each level within the immersive information space contextual information is presented to the user. The contextual information consists of a semantic scale and a pathway to the information they are viewing. An information structure represents the immersive information space of documents. The information structure consists of a collection of documents, and a graph of topics that describe the relationships between the documents. The graph of topics consists of topic nodes that each contain 1) a set of documents that are about that topic, and 2) a set of links to other topics in the structure. The links represent relationships between topics, and indirectly, relationships between the documents. An information structure that represents the collection of documents is used to guide the user to documents of interest and to show relationships between documents. A presentation and interaction model allows navigation through the information structure. The model includes a camera representing a user's focus of attention, and a set of reactable graphical objects representing nodes in the information structure. The interaction model continuously monitors the movement of the camera in relation to the graphical objects and updates the display of the information space.

11 Claims, 9 Drawing Sheets

Microfiche Appendix Included
(3 Microfiche, 216 Pages)

FIG. 8

IMMERSIVE MOVEMENT-BASED INTERACTION WITH LARGE COMPLEX INFORMATION STRUCTURES

RELATED APPLICATION

This application is a continuation of Serial No. 60/048,150, entitled "Immersive Movement-Based Interaction with Large Complex Information Structures" filed on May 30, 1997 pending, which is incorporated in its entirety by reference herein, and which is assigned to a common assignee as the present application.

MICROFICHE APPENDIX

This application includes a microfiche appendix, including 3 sheets of microfiche and a total of 216 frames.

BACKGROUND

1. Field of the Invention

The invention relates generally to information retrieval systems, and more particularly, to information retrieval systems for retrieving information in multi-dimensional spaces, using 3-D spatial modeling of semantic entities, including topics and documents.

2. Background of the Invention

Most information systems organize documents into some type of information structure, such as a hierarchical, relational or object oriented database. For example, a file system on a personal computer or UNIX workstation consists of files organized into various topic based files, with documents placed into files by topical indexing. The organizational structure of the hierarchies are typically such that a particular document or set of related documents can be found by accessing the appropriate directory or file.

However, when the number of documents in a database grows to be very large or when the contents of the documents are semantically multi-dimensional, that is each document is about many different topics or subjects, a hierarchical organization becomes an inefficient and cumbersome mechanism. This is because a given document may be properly related to a number of different topics; duplicating the topic for storage in many different topic directories dramatically increases storage requirements for the database, and introduces additional problems of maintaining each of the duplicate copies. Further, finding related documents is difficult and time consuming, since a strict hierarchy prevent efficient linking of related topics.

Finding information in these large hierarchies is further exasperated when the organizational structure of the hierarchy is unknown. Many users are unfamiliar with the hierarchical structure of the database they use, and thereby cannot readily identify documents or topics of interest. Current interfaces provide little support for navigating large complex hierarchies in such databases. This is because the user is typically only given a static sense of where in the database or hierarchy they are searching, with no dynamic presentation of such context as the user changes their queries.

What is needed is the ability to control the amount of information in the hierarchy that is presented at any given time. An effective interface would provide the ability to smoothly control the amount of information presented at any given time and the level of granularity of the information. Even still a hierarchical structure is limited in it's ability to express relationships between intermediate nodes and documents.

Another approach to storage and access of documents is to use a relational structure such as that used by relational databases where the fields in the database contains selected attributes about the document, such as the date published, author, so forth. This is an effective technique for storing documents, and is widely used in document databases.

However, accessing documents in a relational database can be difficult, particularly for novice or occasional users. The typical approach to accessing documents in a relational database is to enter a query using a form, which is then processed, and the results returned to the user as a long list of documents that match the query. This works reasonably well only if the documents are tagged clearly and precisely when entered into the database with the appropriate attribute information that users are interested in, and when the number of items returned from the query is less than about twenty. When the number of documents returned is greater than about twenty or thirty the task of finding the document or set of documents of interest becomes increasingly unmanageable, since the user now has to scan or review these documents to determine if there is a more precise query that can be applied to the database. As a result, the user is required to reformulate a query to narrow a search. This is often a difficult task in that the user must match what they are looking for against what is actually available in the database. Since the user typically does not know what is in the database to begin with this can lead to a very frustrating experience.

For example, if a user looking for articles about "Siberian Huskies," she may type an initial query for information about "dogs." The result returned may by a list of hundreds or thousands of articles that were about dogs. A subsequent refinement may be to search for information about "Siberian Huskies" directly, which may result in zero articles. Such a result does not mean that the database does not have any useful information about "Siberian Huskies". Rather, the system likely does have some useful information for the user, only at this point the user does not know this fact, because she does not know how to specify an appropriate query that will result in a useful and manageable amount of information.

An ideal system would provide the ability to start of with a broad search such as "dogs" and analyze the long list of returned documents and place them in an organizational structure that would allow the user to effectively refine the original board query down to a set of documents that may be applicable to her needs. Such a system would have the structure of a hierarchical system to help find information and, the fluidity of an interface to help control how much information is presented at any given time, while simultaneously providing the flexibility to store complex relational information.

A third way of organizing information is by using a hyperlink to connect documents together. In this approach navigable links from one document to another are stored as part of the originating, or source, document. This technique allows users to effectively follow a train of thought as expressed by the author of the document.

One drawback to this approach is that the user is totally at the mercy of the author and his or her selection of which items of information in a source document to provide links for, and to which documents to target those links. If the author fails to link a source document to another document that is related to the source document, the user will not find that other document through the source document. Further, hyperlinks are typically a one-to-one link relationship, i.e.

they only allow one connection from a source to a target document, but not in the opposite direction. Thus, they fail to fully capture the relationship between the documents, and make this relationship fully useful in accessing the documents.

There are several additional problems associated with hyperlinks. One, after the user arrives at the target document, the source context is often lost. These jumps are typically discontinuous requiring the user to re-orient themselves after accessing the target document. For example, if a user is reading a document about Siberian Huskies, and accesses a hyperlinked document about the American Kennel Club, then the context of the source document is lost, and the user is now reading about the AKC. After certain number of these semantic jumps, the user can loose the orientation of where they are in the conceptual structure, and the focus or purpose of their original query. Systems that address these problems would provide some visual cues to help the user maintain context as to where they are in the conceptual structure.

Accordingly, it is desirable to provide an information retrieval system that provides a dynamically constructed respresentation of the context resulting from each query, and which provides this information in a graphical environment where the amount or density of information visually presented to the user is controlled.

SUMMARY OF THE INVENTION

Objectives

The general objectives of the system described in this document include the following:

1. To give users a generalized process for refining a search in a structured and organized fashion;
2. To allow users to see relationships between information such that they can:
    a) understand the contents of a database, and;
    b) more efficiently and effectively access information of interest.

The presentation and interaction model support the objectives broadly defined above by striving for the following objectives:

Provide users with the ability to dynamically control the density and granularity of information within a topic of interest.

Provide users with context at every instance in their interaction with a set of information.

Provide users with an indication of the scope of documents they are working with including both semantic scope and logical topic refinement scope.

Show connections between related topic and documents.

Indicate to users how they can refine their search.

The present invention provides an information retrieval system that overcomes the limitations of conventional systems and satisfies these various objects. In one embodiment of the present invention, a large document collection is segmented into various units of information. In order for these segments of information to be meaningful to the user, the information retrieval system provides three different types of cues to the user: scale, context and an indication of the types of selected relationships between items of information in the information structure.

Scale is the relative measure of semantic abstraction. For example, the concept "golden retriever" is conceptually at a much smaller scale than the concept "animal". The present invention provides a continuous, dynamic, visual representation of the scale of various items of information retrieved in response to a user's query.

Context defines where the user currently is in the information structure relative to her starting point in a session. For example, the user may start off with the topic of "companies," navigate into the subtopic of "software," followed by a subtopic of "databases," followed by another subtopic of "relational," followed by another subtopic of "object." At this point, the user's context will be that of "information about object-relational database software companies." The present invention provides a continuous, dynamic, visual representation of the context of the various items of information retrieved in response to a user's query.

Relationships define how items of information and/or meta-information relate to one another. There are basically two types of relationships: 1) relations between information items (e.g. documents or parts of documents) and meta-information items (e.g. topics); and 2), relations between meta-information items and other meta-information items. These relationships can be grouped together based on the type of relationship. For example, relationships between a topic meta-information item, such as "dogs," and subtypes of dogs, such as "golden retriever" and "black labrador" can be grouped together as subtypes of dogs. Further, information items, or documents, about golden retrievers can be grouped together under the topic meta-information item "golden retriever," where the relation is labeled as "about," and further grouped together under the topic meta-information item of "dogs," with the relation labeled as "subsumed" or "under." These groupings and classifications of groupings of relationships provide a graphically scaleable user interface for dynamically controlling the visual density of information displayed to the user, and provide a mechanism for scaling the size of the document collection without impairing the user's ability to access relevant documents.

Using the foregoing framework, the present invention defines a simple but powerful model of a three dimensional (3D) space that represents an information space. An information space comprises an information structure, the projection of the information structure into a 3D space, a set of reactable 3D graphical objects that populate the 3D space and that represent nodes and relationships between nodes in the information structure, and a virtual camera that represents the user's focus of attention and 3D position in the information structure. At any point in time, the information structure of an information space is dynamically determined in response to a user's query and is a representation of the relationships between a collection of documents that satisfy the query. Such an information structure thereby has scope determined by the user's query. For example, the query "all documents written by Tom Jones from Mar. 1, 1995 to Mar. 1, 1996" defines a specific, dynamically generated information structure.

In the present invention, the 3D information space is the medium through which the user interacts with the information structure to both create queries and see their results. In other words, instead of entering text queries as in conventional systems, the present invention enables the user to create queries by navigating through the 3D information space itself, which is dynamically repopulated with 3D graphical objects representing an information structure which is computed in response to the user's movements (query) in the 3D space The present invention further provides for a constant density of visual information that is presented to the user. In response to the user's navigation query in an information space, the information retrieval system controls the graphical size of the various 3D objects that will be displayed in response to the user's movements, such that for any display area, the density of information is constant, where density is a function of the display area, and the number of information items (documents, topics, or other semantic entities) being displayed. This constancy of information density is provided regardless of the semantic scale (whether viewing high semantic scale topics or low semantic scale specific documents) and regardless of the user's context in the information structure.

In one embodiment, the information retrieval system in accordance with the present invention includes a server that dynamically builds and maintains information structures that can be shared among many different client applications, where the information structures are derived automatically from a collection of documents and contain a graph of topics that allow for progressive refinement of the document collection, and a client application that presents information structures to users in a 3D projection of an information space that visually and spatially represents the information structure. The client application preferably includes a camera that represents a user's focus of attention and 3D position in an information space, a set of graphical objects that represent nodes and relationships between nodes of the information structure and have 3D positions in the information space, and a context state that represents the current context of the user in the information space and incorporates the path that the user has taken through the information structure to arrive at the current context. The 3D information space is dynamically generated in response to the user's movements through the 3D information space. The graphical objects are presented by the client application in the 3D information space so that there is constant density of graphical information as the user traverses through the information space.

Preferably, each information space is displayed as a 3D parallel projection space which is infinitely expandable within a normalized volume. A normalized volume is a unit cube.

The set of graphical objects represent semantic entities that are displayed as either text, images, or both in the information space. The graphically objects scale dynamically based on their distance from the camera and their position in the 3D information space, both graphically and semantically. Specifically, in addition to scaling the graphical representation of the object relative to camera position, the graphical objects also scale according to a level of detail of the information associated with the object. The graphical objects are arranged along a z-axis (perpendicular to the surface of the computer display) according to semantic scale. More detailed (i.e. less general or abstract) information appears as the camera zooms along the z-axis in the direction of the computer display (relative to the user).

In one embodiment, the information retrieval system includes a graphical rendering system that scales the graphical objects based on their distance from the camera and their position in an 3D information space, and that supports the dynamic scaling of fonts used to display the graphical objects based on their distance from the camera and their position in the 3D information space.

The information retrieval system operates to provide an interaction model between the user and the system that updates the position of the camera in the 3D information space based on user inputs, updates the positions and level of detail representations of the graphical objects based on the position of the camera in the information space, updates a current context describing the user's present location in and path through an information space including a history of the user's session from their starting point, and allows for both continuous fly-through navigation as well as point-and-click assisted navigation to graphical objects.

In one embodiment, the information retrieval system includes the presentation of cross links in the 3D information space. Cross links show the relationship between a given topic or node in the information structure and the positions of the information objects the node contains as they are positioned in other topics outside of the given topic. Cross links also show the relationship between topics that both contain the same subtopic. Cross links further show the connections between an information object positioned under one topic and all the other topics under which it is also positioned. Cross links are navigable and allow the user to access the topics that are coupled by the cross links.

In yet another embodiment, the present invention is an information retrieval system for displaying information including an information structure having a plurality of semantic entities, such as topics and documents. The information structure is preferably a graph in which the semantic entities are nodes. Each semantic entity has a navigable link to at least one other semantic entity. Each semantic entity is further associated with a graphic object for representing the semantic entity on a display screen. A graphic object may be displayed at any of a plurality of graphic sizes. The system operates with a display window having a variably resizable display area. The display window has an information density which is a function of the number of graphic objects displayed in the display area, such that the greater the number of graphic objects displayed in the display area, the higher the information density.

The system includes a display engine that displays graphic objects of a selected number of semantic entities. The semantic entities are selected from the information structure in response to user queries. The display engine displays the graphic objects of the selected semantic entities but maintains the information density of the display area as a constant at all times, in response to the user's queries for different semantic entities. In this fashion the user has a constant density of information available to view, regardless of the number of semantic entities of the information structure satisfying the user's query.

The present invention provides various methods for displaying semantic information in the form of graphic objects. In one method, there is stored an information structure having a plurality of semantic entities having navigable links to other semantic entities, and graphic objects for representing the semantic entities on a display screen. Each graphic object may be displayed at any of a plurality of graphic sizes. Preferably each graphic object has the same shape. This method includes displaying a first graphic object of a first semantic entity on the display screen, displaying within the shape of the first graphic object the graphic objects of each semantic entity semantically contained within the first semantic entity; and dynamically scaling the graphical size of the displayed graphic objects such that the information density of the display screen is constant.

Another method for displaying semantic information in the form of graphic objects in a display window includes displaying in the display window first graphic objects of a plurality of first semantic entities from an information structure where the display window having a variably resizable display area, and an information density as a function of a number of graphic objects displayed in the display area. A cursor is displayed in the display window, and user inputs are received to move the cursor toward at least one of the displayed first graphic objects. The method includes simulating movement toward a first displayed graphic object by increasing the graphical size of the displayed first graphic objects, and displaying second graphic objects of second semantic entities contained by the first semantic entities; wherein graphic size of the displayed graphic objects is determined so that the information density of the display window is constant.

In another embodiment a method for displaying semantic information in the form of graphic objects in a display window includes storing an information structure having a plurality of levels of semantic containment, where each level of semantic containment includes a plurality of semantic entities. Each semantic entity includes a navigable link to a plurality of other semantic entities, and is associated with a graphic object for representing the semantic entity on a display screen. The semantic entities in the information structure are such that each semantic entity either semantically contains at least one other semantic entity, is or semantically contained by at least one other semantic entity. In this context, the method includes displaying in the display window graphic objects of at least one semantic entity from an Nth level from the information structure. The display window has a variably resizable display area, and an information density which is a function of a number of graphic objects displayed in the display area.

The method further includes, for each semantic entity from the Nth level that is displayed, displaying in the display window the graphic objects of the semantic entities at the (N+1) level that are semantically contained by the semantic entity from the Nth level.

To access semantic entities in the system, there is displayed a cursor in the display window. The user provides inputs to move the cursor toward at least one of the displayed graphic objects for a semantic entity from the (N+1)th level. In response, the method simulates movement a displayed graphic object of a semantic entity from the (N+1)th level by increasing the graphical size of the displayed graphic objects of the semantic entities from the (N+1)th level, and displaying graphic objects of semantic entities at a (N+2)th level contained by the semantic entities from the (N+1)th level. The method determines graphic size of the graphic objects to be displayed so that the information density of the display window is constant for any number of graphic objects displayed.

BRIEF DESCRIPTION OF THE DRAWINGS

FIG. 8 is an illustration of a user interface of the present invention showing the 3D space projection of graphic objects with constant information density.

DETAILED DESCRIPTION OF THE PREFERRED EMBODIMENTS

I. Definition of an Information Structure

Figure 1:
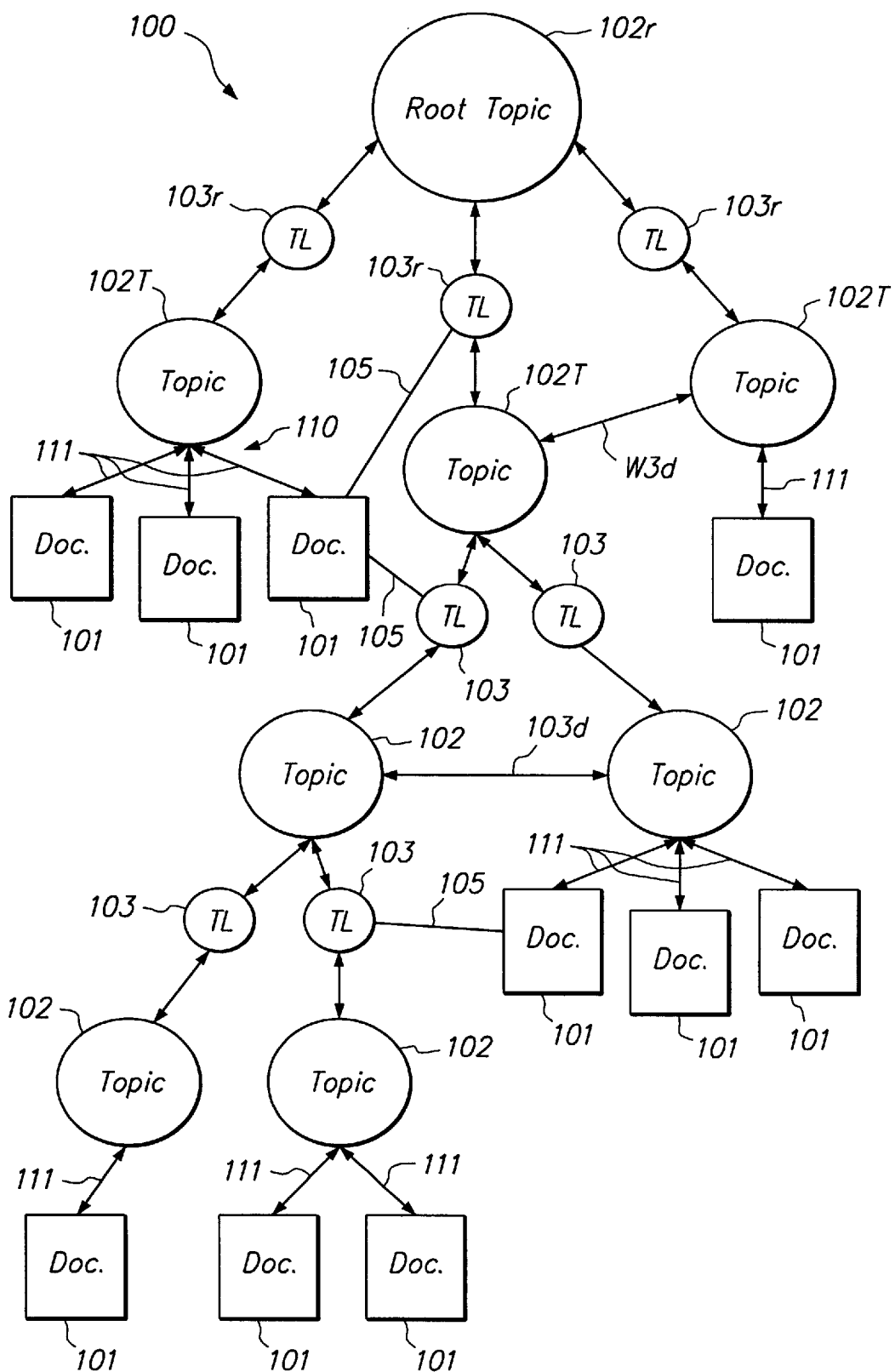
FIG. 1 is an illustration of an information structure.

FIG. 1 represents an information structure. An information structure 100 is an organized graph structure that represents the relationships between a plurality of document nodes 101 and topic nodes 102. (Throughout this disclosure references to the term "node" without any subsequent reference number are understood to reference to any type of node.) Each node can be both a parent or a child node.

Each document node 101 in the information structure 100 has a set of attributes (such as the author, date, title, and the like) and is "about" a set of topics that are represented by the topic nodes 102. Each document node 101 is preferably described by the following items:

title summary author creation and publication dates source of the document

A title is a short textual description of the document. A summary is a more lengthy description of the document contents. Optionally, the document node 101 may contain either a reference to the location of the original document (such as a uniform resource locator (URL) hyperlink reference), or the actual contents of the document.

Figure 9:
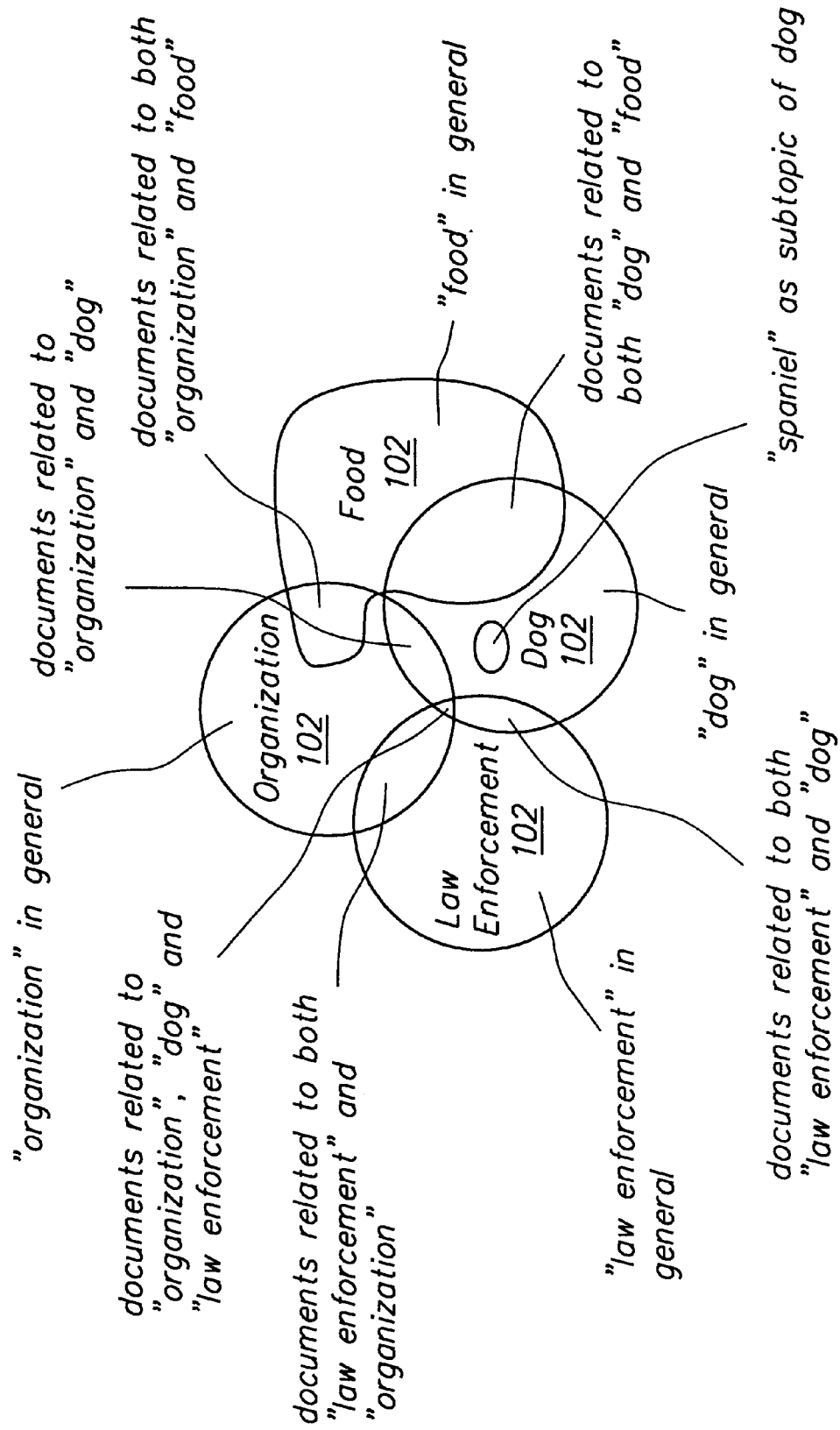
FIG. 9 is an illustration of the logical intersection of topic nodes.

As described above, documents and topics may have various relationships to each other. Relationships between the plurality of document nodes 101 are represented by a plurality of interconnected topic nodes 102 that represent attributes of the document nodes 101, and a plurality of topic link relationships 103 between topic nodes 102. A topic node 102 represents either 1) a single concept (e.g. "computer music" or "music computer"), or 2) a logical combination of a plurality of concepts (e.g. "'computers AND 'music'"). Each topic node 102 is preferably represented by the following items textual label short textual label gloss The textual label is a complete textual description of the topic node 102, such as "'computers' AND 'music'". The short textual label is a textual description of the topic node 102 relative to it's parent topic node 102. For example, if a parent topic node 102a is labeled "computers" and a child topic node 102 represents a logical intersection between "computers" and "music", then the child topic node 102 would have a short label of "music". FIG. 9 illustrates another example of the logical intersection of topic nodes, here with the various intersection of the topics "law enforcement," "dog," "food," and "organization." The figure illustrates that the topic "dog" contains or encompasses all documents which in any way are associated with "dog", irrespective of whether or not they are subtype relationships.

The gloss contains a full textual description of the topic node 102. For example, for a topic node 102 labeled "computer", the gloss might be "An electric machine that performs high-speed mathematical or logical calculations or that assembles, stores, correlates, or otherwise processes and prints information derived from coded data in accordance with a predetermined program".

Topic link relationships 103 generally fall into two classes: parent-child relationships and sibling or related relationships The parent-child relationships define a plurality of levels in the information structure. The parent-child relationships between topic nodes 102 described above fall into two broad categories: semantic subtype relationships 103, and intersection relationships 103. A semantic subtype relationship 103 is a relationship that is a conceptual relationship between two topics, such as one topic being conceptually broader and including a second, narrower topic. For example, the topic "dog" is conceptually related to the topic "mammal," and would be a subtype of it.

An intersection relationship 103c is where a topic node 102 represents the logical AND of two or more topics 102.

Nodes at the same level, and nodes at different levels may be interconnected by related topic links 103d. Whereas conventional hierarchical structures only represent parent-child relationships, the graphical nature of the information structure 100 handles more complexity than a fixed hierarchical structure and contains information about the related topic links 103d between nodes in the structure.

The information structure 100 of FIG. 1 is merely exemplary. In an actual embodiment, the information structure 100 would be significantly larger, perhaps including hundreds or thousands of nodes. The relationships between the nodes however, have the described structural features.

In the structure represented in FIG. 1, semantic entities called "topics" are represented by the topic nodes 102. For each topic node 102, there also exists a document link set 110 of document links 111 to document nodes 101 that are "about" the topic represented by the topic node 102 The document nodes 101 may be "about" many different topics, and hence, there may be a plurality of document links 111 from a plurality of topic nodes 102 to a single document node 101. This plurality of document links 111 relationships captures the semantic multi-dimensionality of the information structure 100, enabling the same document to be related to many different topic nodes 102 within the information structure so long as the document node 102 for the document is about the same topics that the topic node 102 represents.

Figure 2:
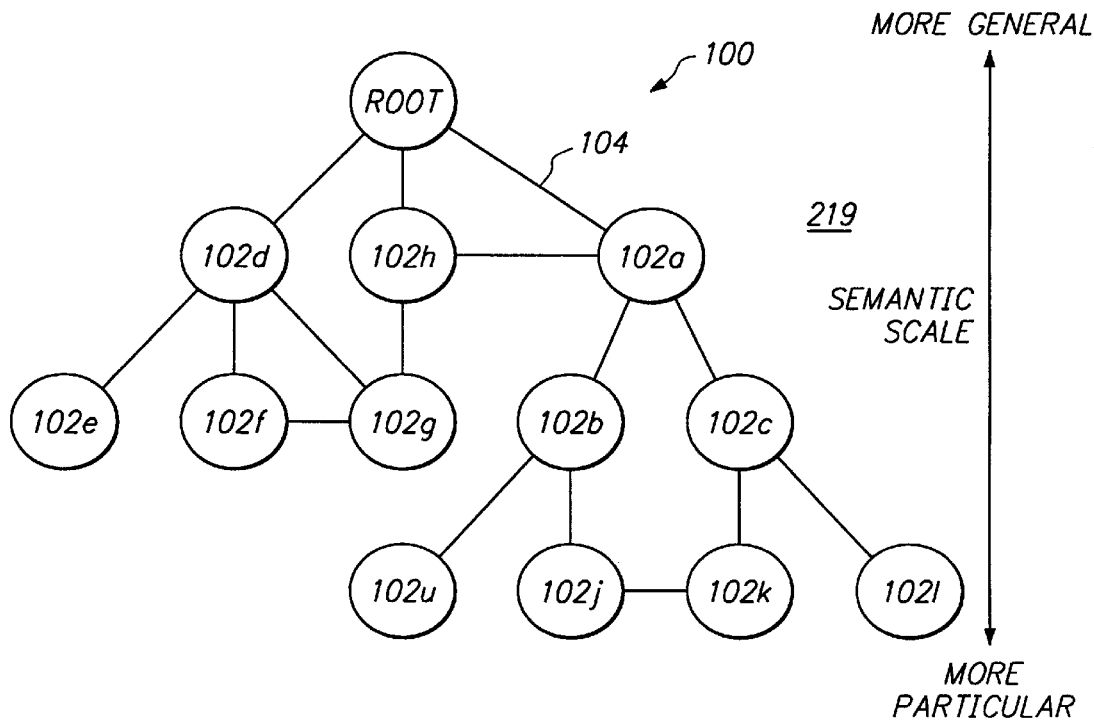
FIG. 2 is another illustration of an information structure.

Referring also to FIG. 2, the topic nodes 102 of the information structure 100 each have a measure of relative semantic scale 219, where the semantic scale is reduced or narrowed by moving 'down' the graph via child relationships. Hence, topic nodes 102 that are 'lower' in the information structure depicted in FIG. 1 or FIG. 2 are narrower or lower in semantic scale. A node higher up in the structure is more general, or at a conceptually higher semantic scale than a node on a branch lower down in the structure. In FIGS. 1 and 2, the information structure 100 is presented so that the vertical placement of nodes represents both the relative semantic scale, and the relative semantic containment of topics in the information structure 100, though in fact there is no vertical organization inherently present in the information structure 100. By way of specific example, a node 102 may represent the topic "dogs", which has a higher, or more general degree of semantic scale than a child node 102 which represents the topic "Siberian Huskies."

For every information structure 100 there exists a singular root node 102r that contains a plurality of root topic link relationships 103r. These root topic link relationships 103r define a set of top-level topic nodes 102t that are the entry points into the information structure 100. Traversal of the information structure 100 is initiated through these nodes 102t. Related links 105 between nodes under different topics express the conceptual relationships between various topics to each other.

The meaning of each topic node 102 in the information structure 100 is dependent upon the path from the root topic node 102r to the given topic node 102. This traversal path is called a context 107 and consists of the root topic node 102r followed by a series of topic link 103/topic node 102 pairs to the given (or current) topic node 102. This context 107 is useful for a user to interpret both the topic nodes 102 and the document nodes 101 for the current topic node 102. The context 107 is also useful for giving the user a global understanding of where she is in the information structure 100 and what her current location in the information structure 100 means.

Given the information structure 100 as described above, a set of cross links 105 represents cross relationships between document nodes 101 in a single topic node's document link set 110 and the same document node 101 contained in all another topic node's document link set 110. These cross links 105 define the additional contexts 107 in which each of the document nodes 101 assigned to a topic node 102 also exist.

Semantic containment is a function of parent-child relationships in the information structure. Referring to FIG. 2, a parent node 102 is defined to semantically contain all and only its child nodes 102, including any further grandchild nodes 102. For example, node 102a semantically contains nodes 102b and 102c, and their respective child does, 102u, j, k, l, but does not semantically contain nodes 102e, 102f, and 102g. Semantic containment is used to express the relationships of topics to subtopics in the information structure 100. Further, the number of child nodes 102 for any given topic node 102 is limited to the number of topic nodes 102 that can be displayed on a screen at any given time so that the density of information can be maintained. During the structure generation process, when the number of child nodes 102 of a topic node 102 grows too large, the set of child nodes 102 is broken down into groups where the groups are represented by a new set of child nodes 102. This process is also applied to the relationship between document nodes 101 and topic nodes 102.

Figure 10:
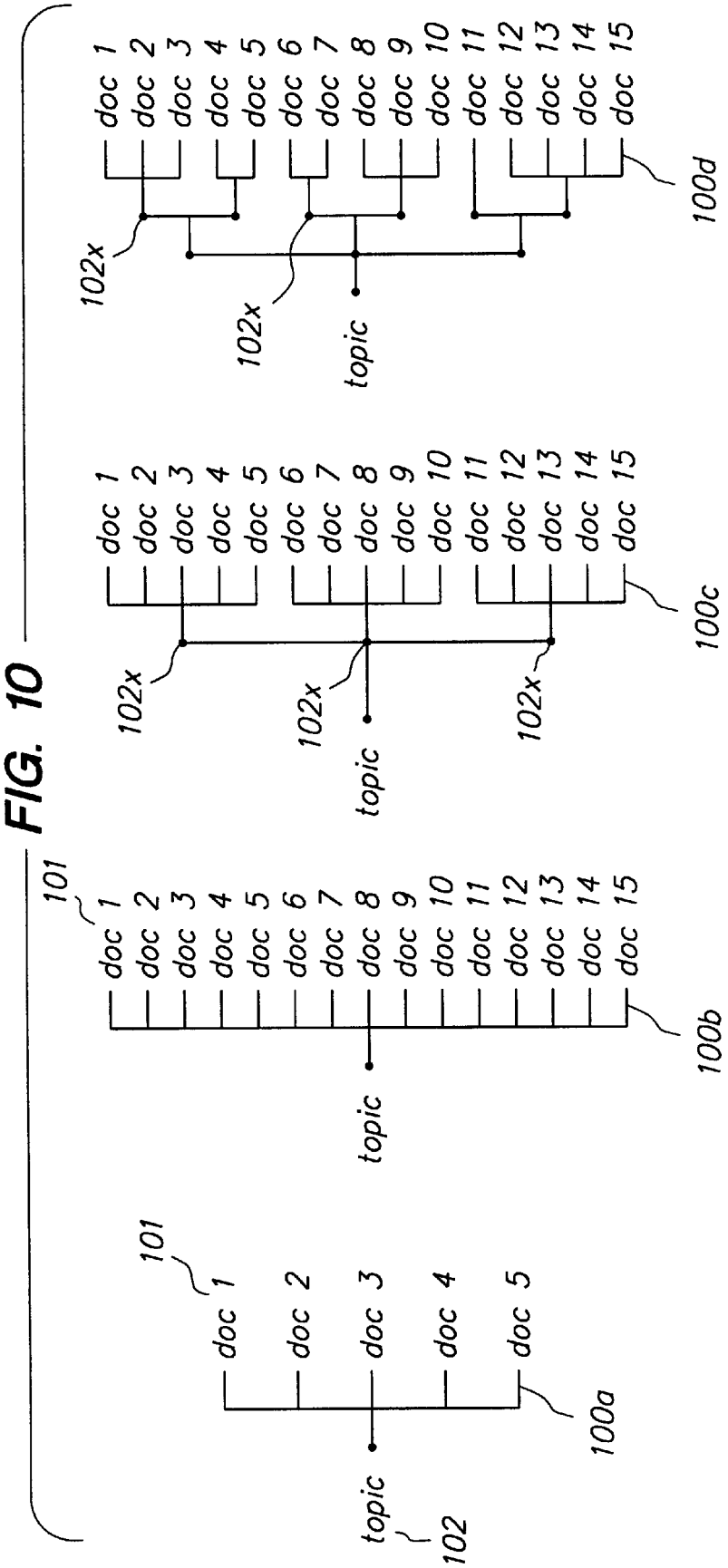
FIG. 10 is an illustration of the dynamic generation of topic nodes to maintain constant information density.

As illustrated in FIG. 10, when the number of document nodes 101 of a topic node 102 leaf of the information structure 100 is above a user specified threshold, a new set of topic nodes 102x is constructed to break down the set of document nodes 101 into smaller groups. In FIG. 10, the information structure 100a has only 5 document nodes 101, and thus is easily reviewed by the user. However, information structure 100b has 15 document nodes 101, which is too many for a user to easily review. Accordingly, a new set of topic nodes 102x is dynamically created, as shown in information structure 100c. If the user threshold is less then 5, for example, then further intermediate topic nodes 102x can be generated within the information structure, as shown in information structure 100d. This process of breaking down larger groups into smaller groups and labeling the groups based on common attributes enables the present invention to present a constant density of information to the user at any given point of time regardless of the number of documents or topics which currently satisfy a user's query, and allows users to more specifically narrow their search. This process is also the basis of the information structure generation function.

Appendix A provides a description of one embodiment for the information structures using topic nodes in a knowledge base, and a structuring process for generating the information structures in response to a query.

II. Definition of a 3D Information Space

To provide a means of navigating through the large collection of documents represented by information structure 100, the present invention defines an immersive 3D information space 200 that represents the organizational properties of the information structure 100. This 3D information space 200 is the graphical representation of the information structure 100 that is visually represented on a 2D computer display screen 220. The 3D information space 200 mirrors the information structure 100, adding graphical representations of the underlying information structure 100. In other words, for each element in the information structure 100 there exists an element in the information space 200 that contains graphical representations of the information structure 100 element.

Figure 3:
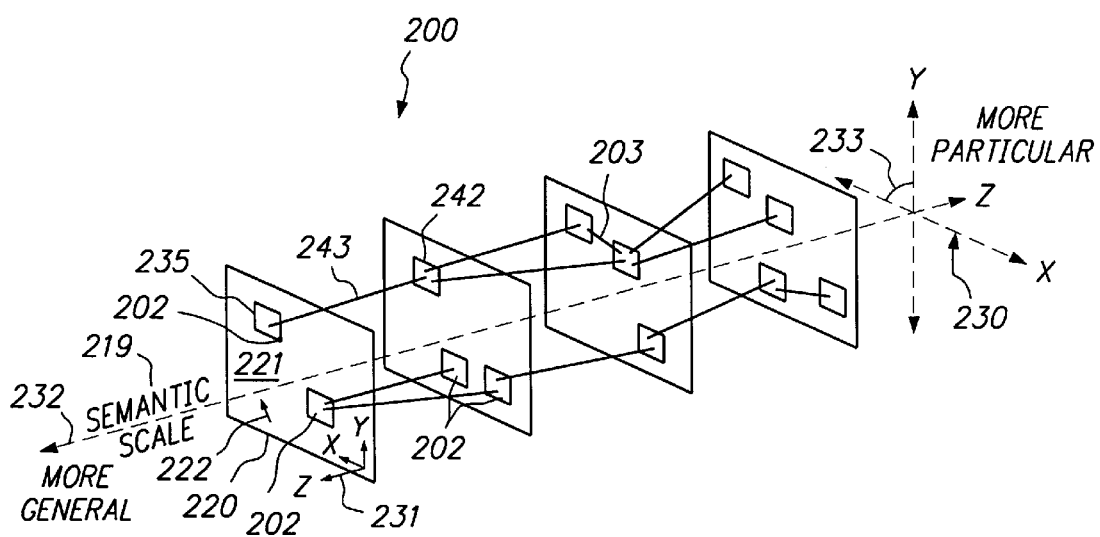
FIG. 3 is an illustration of an information space in a 3D environment.
Figure 7:
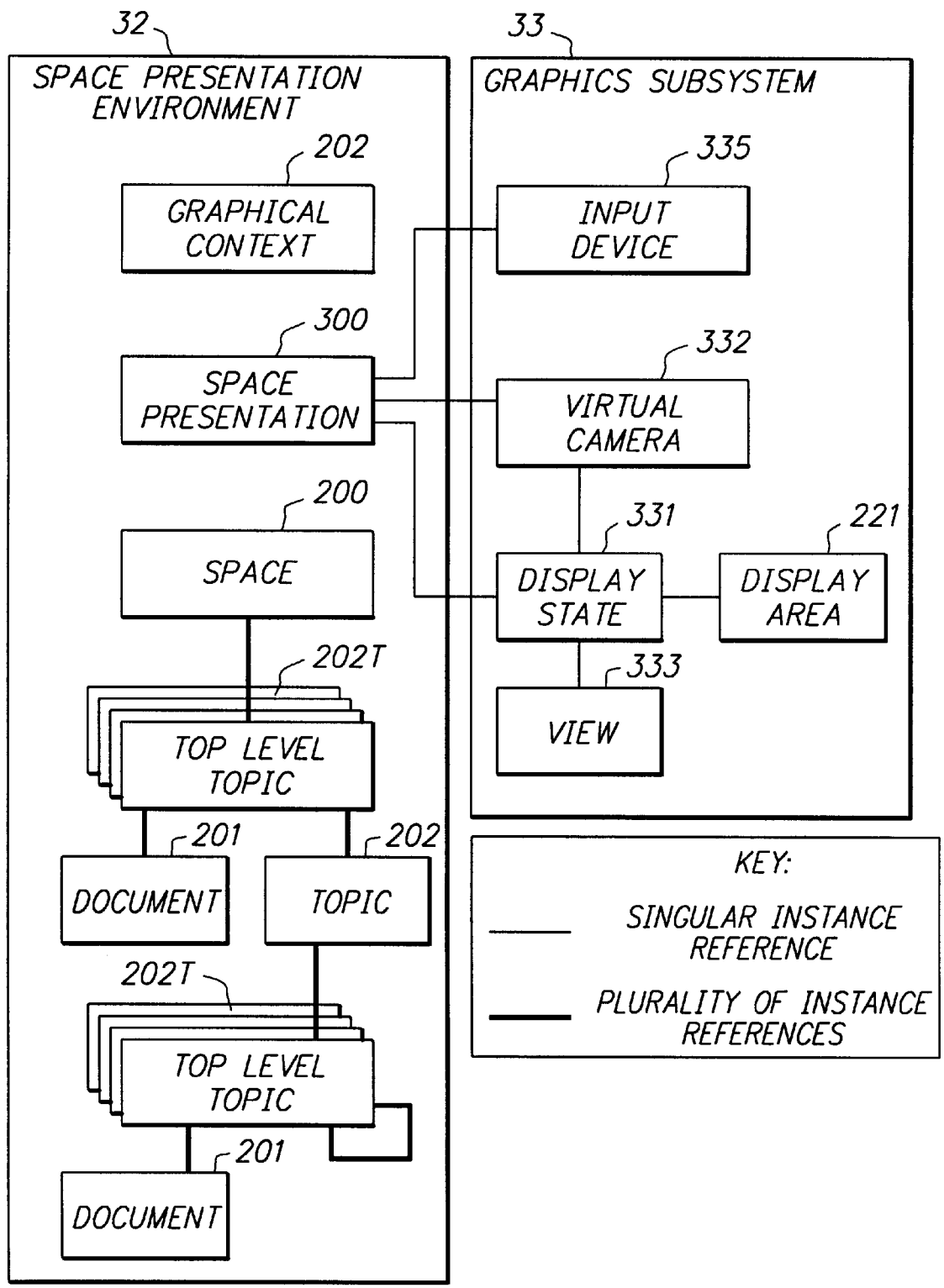
FIG. 7 is an illustration of the relationship between the space presentation environment and graphics subsystem.

Referring to FIG. 3 and to FIG. 7, the display area 221 of a computer display screen 220 is defined to represent the X and Y axes of a 3D coordinate system 230. The Z-axis 232 is positioned perpendicular to the plane of the display area 221. The Z-axis 232 is used to represent the semantic scale of the information structure 100 and the semantic containment relationships between nodes. The XY plane 233 is used to represent different types of sibling relationships at any particular level of the information structure 100.

A 3D information space 200 has a base 3D coordinate system 230 that represents the root topic node 102r of the information structure 100. The set of top level graphical topics node sub-spaces 202 that represent the top-level topic nodes 102t in the information structure 100 are defined in the base 3D coordinate system 230. Each topic node 102 in the information structure 100 is represented by a graphical topic node sub-space 202 (or more simply a graphical topic node 202). Each graphical topic node sub-space 202 has an 3D location defined in a local 3D coordinate system 231 that is relative to its parent graphical topic node sub-space 202. Each parent graphical topic node sub-space 202 contains all of the child graphical topic sub-spaces 202 that are represented by the child topic nodes 102 of the corresponding parent topic node 102 for the given parent graphical topic node sub-space 202.

In order to present the information structure 100 to the user on a computer display, each graphical topic subspace 202 in the information space 200 is represented by a 3D topic graphical object 242 that is sensitive to the movement of a virtual camera 332 in the information space 200. To maintain the constancy of information density, the graphical size and presentation of the topic graphical object 242 changes depending upon the amount of display area 221 available and the number of topic graphical objects 242 available in the given context 107. The topic link relationships 103 between topic nodes 102 can optionally be represented by a 3D line 243 that connects between the 3D anchor points of the two graphical topic sub-spaces 202. Optionally, the semantic containment that is represented by the parent-child relationship in the information structure 100 can be represented by a graphical container object that bounds the topic graphical sub-space 202. An example of a graphical container object is a 3D box that encompasses all of the child graphical sub-spaces 202b.

Within the information space 200 there are a set of graphical document objects 201 that represent the document nodes 101 Since the each document node 101 may be linked to multiple topic nodes 102, graphical document objects 201 may have multiple locations within the 3D coordinate system 230 where each location is defined in the local 3D coordinate system 231 of the graphical topic sub-space 202. The present invention defines two different ways of handling the multi-dimensionality of these relationships. One, for each document node 101 location in the information structure 100 there can be a multiple graphical document objects 201, each with a 3D location 235 defined in world 3D coordinates 230. This approach can also be modeled by having one graphical document object 201 that is graphically drawn in multiple 3D locations where each location is defined relative to the local 3D coordinate system 231 of each of the graphical topic sub-spaces 202.

The second approach is to use a single graphical document object for each document node 101 in the information structure 100 and have its 3D location 235 move/animate from one position to another in the 3D coordinate system 230 to another.

As described above, the context 107 represents where the user is in the information structure 100 relative to the root topic node 102r. In the corresponding information space 200, a current graphical context 209 is determined by the particular graphical topic node sub-space 202 that user's location currently occupies, and the path traversed through the information structure 100 to reach the topic node 100 that the graphical topic node sub-space represents. As a result, each graphical topic node subspace 202 in the information space 200 corresponds to a unique context 107. This context 107 is graphically represented by a singular graphical context 207 (not shown). The graphical context 207 consists of a textual or pictorial representation of the context 107. The graphical context 207 is displayed in one of seven locations in the 2D display area 221: center, top left corner, top center, top right corner, bottom left corner, bottom center, and bottom right corner. Previous contexts (including both context 107 and its corresponding graphical context 207) are maintained in a context stack. The way graphical topic nodes 202 are added to the current graphical context 207 (and hence the context 107 which operates in parallel to graphical context 207) depends on their relationship to the previous topic on the context stack 107. When a child node 102 is added to a context 107 it is appended to the current context 107. When the user moves into a sibling node 102, the context 107 is changed to represent the path to the sibling node 102. As noted above, the changes to context 107 are reflected directly by the graphical context 207.

In the present invention, information retrieval and query formation are controlled by movement through the information space 200 from one graphical topic node 202 to another. The movement of the user through the information space 200 from a graphical parent node 202 to a graphical child node 202 is interpreted as either 1) a semantic refinement of the parent topic node that narrows the semantic scope, or 2) a Boolean query that AND's the topics 102 associated with the two nodes 202.

For example, if a user moves from a graphical topic node 202 of "pets" into the child graphical node 202 "dogs" that is linked by a subtype topic link, this is interpreted as a semantic refinement of "pets." If a user moves from a graphical topic node 202 of "pets" into the child graphical topic node 202 "dog food" that is linked by an intersection topic link, the Boolean description of the current context 207 resulting from that movement may be described as "Pets AND Dogs". Repeated movement from parent to child graphical topic nodes thus creates successive Boolean logical operations. As a result, successive movement from parent to child graphical topic nodes 202 in the information space 200 constrains the document set 110 in the information structure 100 that is associated with the current context 107.

Alternatively, if a user moves from a graphical topic node to a sibling graphical topic node via a related topic link 203 (that represents a related topic link 103), the sibling node replaces the previous node on the graphical context stack 207. For example, if the user moves from the graphical topic "Dogs" to the sibling graphical topic "Cats", "Cats" would replace "Dogs" on the graphical context stack 207; the corresponding replacement occurs in the context stack 107.

Thus, movement in the information space 200 defines both the query to the information structure 100, and the resulting display of the information space 200 which is updated to reflect such movement.

Figure 4:
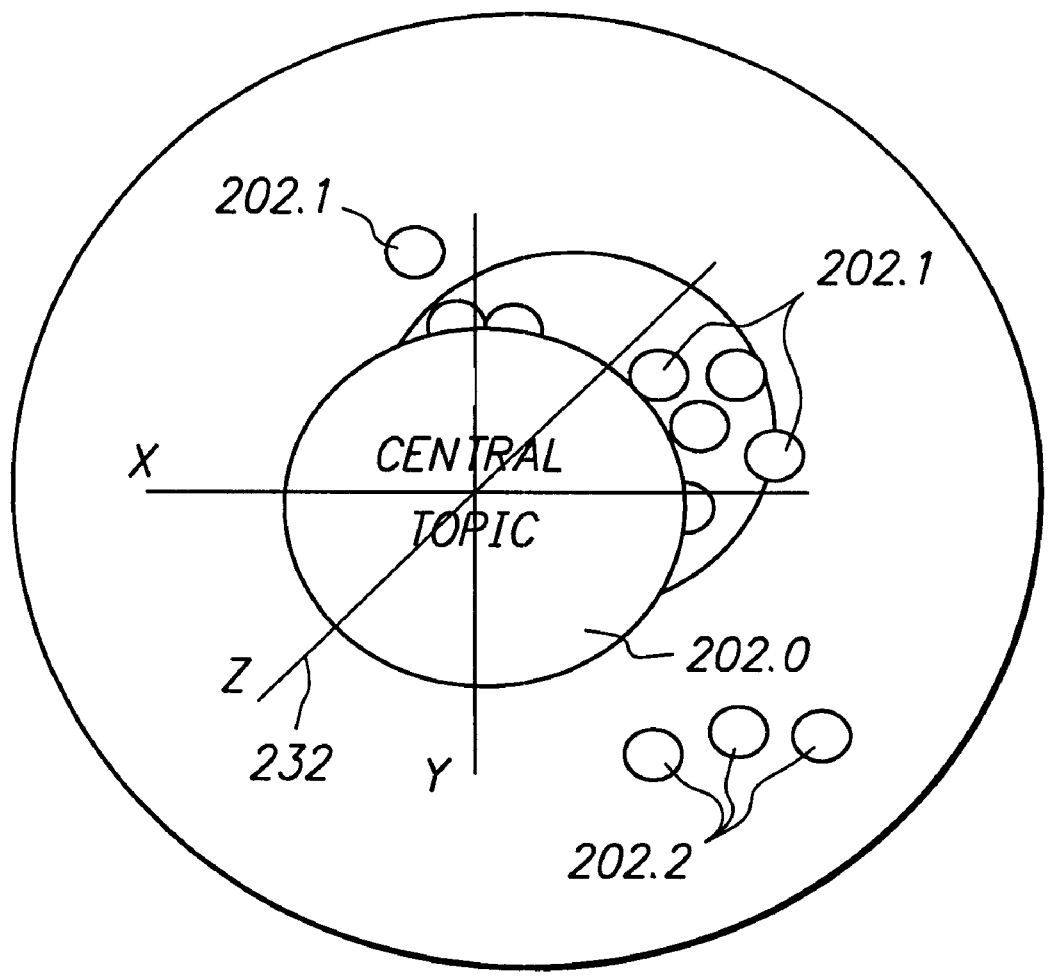
FIG. 4 is an illustration of the concept of semantic containment.

FIG. 4 depicts the principle that some topic nodes 202.1 are semantically contained by a central topic node 202.0, while other topic nodes 202.2 are merely connected to it. In the 3D graphical environment of the present invention, graphical topic nodes 202.1 contained by another graphical topic node 202.0 are represented as being further forwards (into the display area 221) along the Z-axis 231. Graphical topic nodes 202.2 which are connected to a central graphical topic node 202.0 are arranged on the display area 221 of the screen in the XY plane 232 containing the central graphical topic node 202.0. In addition, movement forward on the containment or Z-axis 231 results in further concept refinement, reducing the number of relevant documents, while movement to those topics which are connected in the XY plane 232 do not necessarily narrow the search space.

Movement forward along the Z-axis 231 results in a zoom operation that stretches the XY plane 232 around the user's position in 3D coordinates 230. As a result the graphical objects (topic nodes 202 and other objects) move apart and grow in size on the 2D display area 221 allowing graphical objects that correspond to lower level nodes in the information structure 100 to be presented. This zoom operation reveals more details around the center of the 2D display area 221. Movement backward along the Z-axis 231 shrinks the XY plane 232 around the user's position in 3D coordinates 230. As a result of the XY plane 232 shrinking, graphical objects move closer together.

As either of these movements along the Z-axis 231 take place, the information retrieval system selects which graphical objects to display and their size so that the density of graphical information is constant. For example, as the user moves backward on the Z-axis 231, the graphical objects 202 that correspond to lower level nodes 102 in the information structure 100 are removed from the display area 221, and higher level nodes 202 are added. The direct result of this process is the presentation of a constant level of information density controlled directly by the user's movement in the information space 200.

III. System Description

A. High-level System Description

Figure 5:
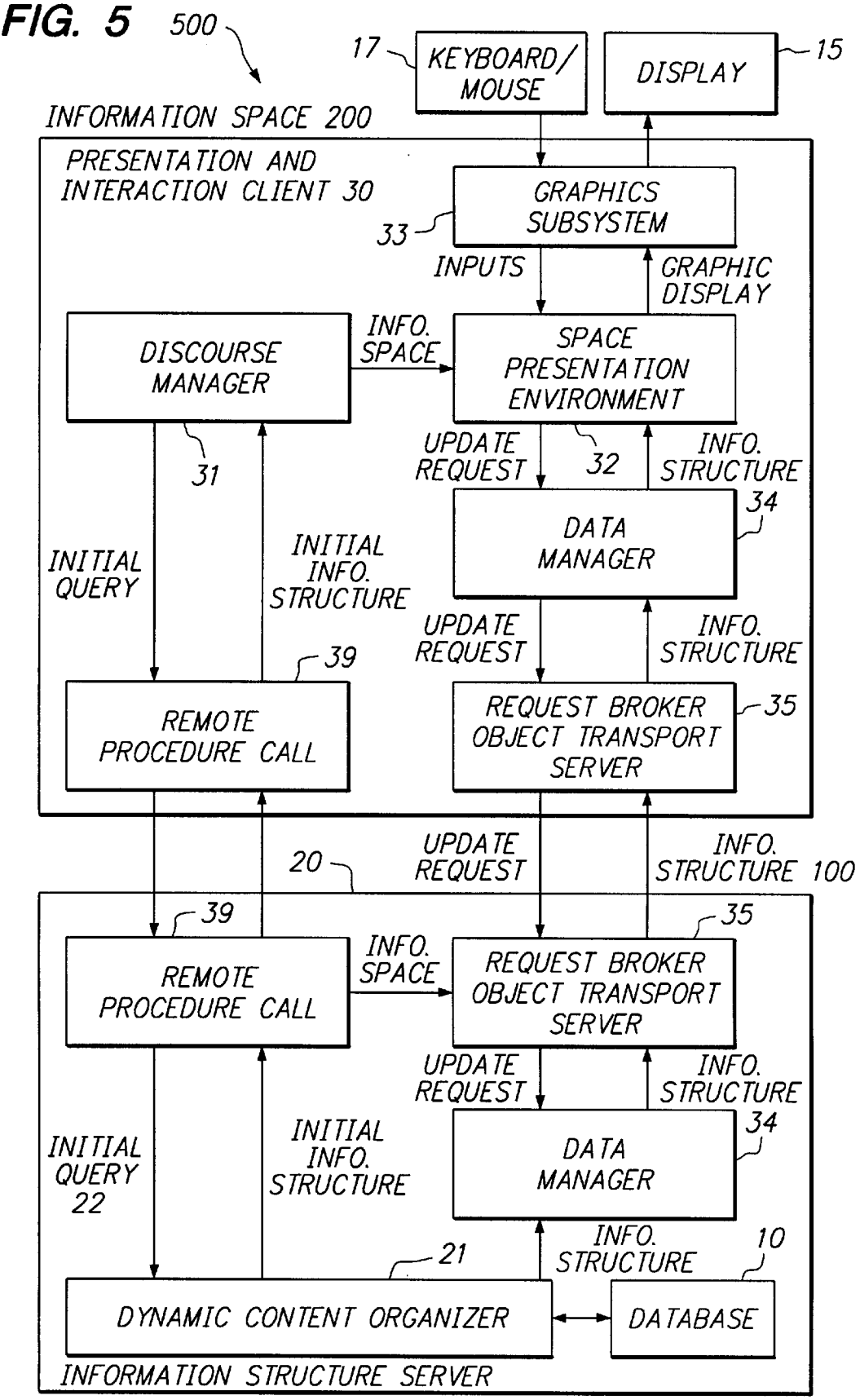
FIG. 5 is an illustration of a system in accordance with the present invention.

Referring to FIG. 5, there is shown an embodiment of an information retrieval system 500 in accordance with the present invention. The system 500 consists of three main components:

A database 10;

An information structure server 20; and

A information space presentation and interaction client 30.

The database 10 stores a collection of documents 101. For each document 101, the database 10 stores a set of meta-data that describes the document 101. This meta-data comprises: a) a set of attributes that describe the document 101 (e.g. who the author was, when the document was created, etc.), and b) a set of topics 102 define what the document is "about" (e.g. "Siberian Husky," "dogs," "dog food"). The derivation of the document attributes and topics 102 that describe a document 101 is not important for this disclosure, only that they exist and can be stored in the database 10.

The information structure server 20 is responsible for responding to user queries 50 for information structures 100 and delivering the information structure 100 back to the information space presentation and interaction client 30. In turn, the information space presentation and interaction client 30 is responsible for presenting the information structure 100 to the user in the form of an information space 200. In addition, the client 30 is also responsible for responding to a user's interaction with graphical objects of the information space 200 presented to the user and dynamically reorganizing the graphical presentation of the information structure 100.

As illustrated in FIG. 5, the three major components are broken down into the following primary components:

Discourse Manager 31;

Space Presentation Environment 32;

Graphics Subsystem 33;

Data Manager 34;

Request Broker and Object Transport Mechanism 35; and

Dynamic Content Organizer 21.

The microfiche appendix contains an exemplary embodiment of class definitions for an implementation of these components.

The discourse manager 31 is responsible for directing the high level interaction between the user and the system 500. The discourse manager 31 interfaces with the request broker 35 to query the information structure server 20 to generate an information structure 100. Once the discourse manager 31 has received the initial elements of the information structure 100, it directs the space presentation environment 32 to present the information space 200 to the user.

The space presentation environment 32 is responsible for coordinating the fine grained interaction between the user and an information space 200. Referring to FIG. 7, the primary mechanism for controlling this interaction is a space presentation 300. The space presentation 300 presents the graphical objects to the user on the 2D computer display screen 220 using the graphics subsystem 33. The graphics subsystem is responsible for displaying graphical objects (e.g. graphical topic nodes and documents 201) on the 2D computer display screen 220. The user, represented by a virtual camera 332 situated in the information space's 3D coordinate system 230, can then respond by moving a cursor 222 (FIG. 2) relative to the graphical topic nodes 202 and graphical document objects 201 shown on the 2D computer display screen and, using an input device, move his or her position around the information space 200. When a user moves close to a graphical topic node 202 (where "close" is defined by a set of rules attached to the graphical topic node 202) in the information space 200, an event is triggered that results in the space presentation environment 32 querying the data manager 34 for more elements of the information structure 100. One embodiment of a visual camera 332 is disclosed in Appendix B.

The data manager 34 is responsible for managing the information structure 100. Since the information structure 100 is inherently a graph and can contain cyclic references to nodes in the graph, the data manager 34 provides functions to facilitate referencing cyclic graph nodes in the information structure 100. This is accomplished via a single level of indirection through a central object reference table maintained by the data manager 34. The data manager 34 also provides a mechanism to allow those cyclic graphs to be transported across the network from the information structure server 20 to the information space presentation and interaction client 30. The data manager 21 acts as an intermediary between the space presentation environment 32 and the dynamic content organizer 21, and provides a transparent mechanism for the space presentation environment 32 to query the information space server 20 for more details of an information structure 100. The data manager 34 component is shared between the client 30 and the server 20.

The request broker and object transport mechanism 35 provides low level network communications between the client 30 and the server 20.

The dynamic content organizer 21 is responsible for responding to user queries and generating information structures 100, A user query is typically interpreted into the form of a Standard Query Language (SQL) select statement 22. This select statement is used to select a set of documents 101 and their corresponding meta-data (including a set of topics 102 associated to each document 101) from the database 10. The document 101 meta-data is used to construct an information structure 100 with the properties described above.

The dynamic content organizer (DCO) 21 generates an information structure 100 by first selecting all of the documents 101 from the database 10 that match the select statement 22. For each of these documents 101 the DCO 21 selects the corresponding set of document topics 102 that describe what the document 101 is about. From these sets of document 101-topic 102 co-occurrences, the DCO 21 constructs a co-occurrence graph that describes the relationships between the document topics 102 as defined by the documents 101. After creating this graph, the DCO 21 traverses the graph to find the top-level topic nodes 102t and places them under a newly constructed a root topic node 102r.

The method described above is one way that information structures can be generated. Appendix A describes this method in further detail. Other methods can be used to generate an information structure 100, but once they are in the form for an information structure 100 described above this disclosure describes how the user can interact with those information structures 100.

B. Behaviors of Objects with User Interaction

Figure 6:
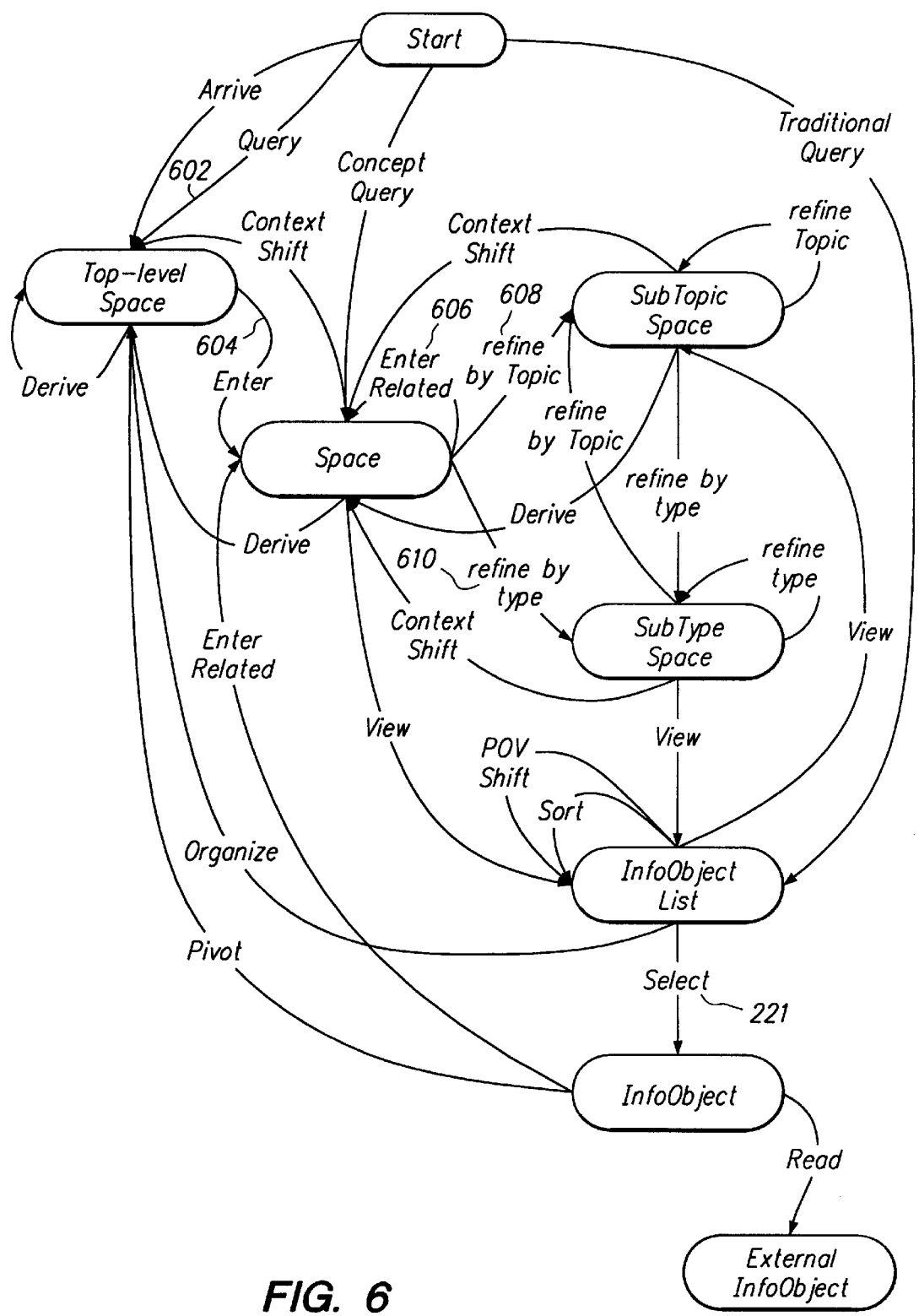
FIG. 6 is a state transition diagram of the behavior of a system in accordance with the present invention.

The system 500 provides two basic phases of interaction with the user: 1) initiation of the information space presentation, and 2) dynamic presentation and interaction with an information space. FIG. 6 illustrates a state transition diagram for the behavior of the system.

1. Initiation of the Information Space Presentation

The interaction with the information space 200 is initiated by the user entering 602 a query for information (in the form of a Standard Query Language select statement 22). The discourse manager 31 receives this query from the user and relays it to the dynamic content organizer 21 via the request broker 35 to get an initial information structure 100. From this information structure 100, the discourse manager 31 constructs an information space 200 that it passes to the space presentation environment 32 for presentation 604 to the user. When the user requests a new information space 200 (e.g. by entering 606 a related node's subspace 202, by refining by topic 608, or by refining by type 610), the discourse manager 31 is responsible for taking the current information space 200, stopping the current presentation, pushing it onto a space presentation stack, and then loading the new information space 200. The space presentation stack maintains the users history of queries 22 and resulting information spaces 200 over an interaction session with the user.

While the discourse manager 31 controls the course grained interaction with the user, the space presentation environment 32 handles all of the fine grained user interactions within an information space 200. The space presentation environment 32 is responsible for presenting the initial set of graphical objects that represent the information space 200 to the user, and then allowing the user to move relative to the graphical objects positioned in the information space 200's 3D coordinate system 230 and dynamically trigger queries 602 for further refinements or generalizations within the information structure 100. For example, when a user moves forward along the Z-axis 231 relative to a graphical topic node 202 and crosses into the graphical topic node sub-subspace 202, the space presentation environment 32 detects this event and dynamically queries the data manager 34 for additional topic nodes 102 in the information structure 100. If the user has not traversed into this portion of the information structure 100 previously, the data manager 34 issues a request to the information structure server 20 to generate additional levels of the information structure 100 as appropriate for the given context 107. The request broker 35 relays this request between the client 30 and the information structure server 20.

2. Dynamic Presentation and Interaction with an Information Space

FIG. 7 illustrates the relationships between the space presentation environment 32 components and the graphics subsystem 33 components. The primary component for driving the presentation of and interaction with an information space 200 is a space presentation 300. The user's interaction with the information space 200 is initiated by the space presentation 300 traversing the information space graphics structure 200 and issuing requests to the display state 331 to draw the graphical objects (e.g. graphical topics 202 and document objects 201) on the 2D display screen as represented by the display area 221. To perform this display operation, the display state 331 uses a virtual camera 332 that models the user's position in a 3D coordinate system 230 and a view 333 that maps the 3D coordinate system 230 into the 2D coordinates of the 2D display area 221. In the model preferred in the present invention, the view 333 is used to zoom, or expand the 3D coordinate system 230 as the user moves forward along the Z-axis 231, resulting in objects moving further apart in the 2D display area 221. As the 2D display area 221 expands, the size, selection and amount graphical information displayed on the 2D display screen is changed to ensure that the density of graphical objects displayed remains constant, though the selection of nodes in the information structure 100 changes. This process is described in more detail below.

After the initial presentation of the information space 200 and graphical objects therein to the user, subsequent interaction with the information space 200 occurs in four phases:

1. User movement;
2. Space presentation 300 reaction;
3. Space presentation 300 animation update; and
4. Space presentation 300 display.

In the first phase, user movement, the user moves his or her position in the space by moving the virtual camera 332. Movement of the virtual camera 332 is controlled by the space presentation 300. The space presentation 300 receives input events from the input device 335, such as mouse movements, mouse button clicks, and keyboard events. The space presentation 300 maps these events to movements of the virtual camera 332 in the 3D coordinate system 230.

The second phase is to react to the user's movement in the information space 200. This reaction phase is also executed by the space presentation 300. The space presentation 300 traverses all of the topic nodes 202 and documents objects 201, represented as graphical objects in the information space 200, and they in turn react to the user's 3D position relative to that node, where the user's position is defined by the virtual camera 332. The reaction of each node is controlled by its parent node. This gives global control of the reaction within the context of each of the topic nodes 202.

The reaction of the nodes is defined by a set of rules that are based on the user's relative position to a graphical object and the current state of the system. For example, if the position of the virtual camera 332 moves into the subspace defined by the graphical topic node 202, the graphical topic node responds by presenting its child nodes 202. If a graphical representation of the child nodes 202 does not exist, the graphical topic node will request the corresponding child topic nodes 102 from the data manager 34 that manages the information structure 100 and will dynamically build the corresponding graphical topic nodes 202. If the data manager 34 does not have the requested topic nodes 102 in the memory of the client software 30, a request is issued to the information structure server 20 to build the corresponding information structure 100's topic nodes 102. Other actions that can occur in the react phase include:

i) setting the target state of graphical objects, e.g. the target size, color and/or location of an information object.

ii) a change in global state, such as the change in graphical context 207 (which is reflected in the underlying context 107).

iii) pushing the previous graphical context 207 onto the context stack.

iv) a change in local state, e.g. setting which node in a sub-graph is active.

Following the react phase is the animation update phase. During the animation update phase all of the graphical objects whose current state (e.g. current location in 3D coordinates 230) is different from the target state that was set during the react phase are incrementally updated to a new value that that is closer to the target state; or, if the current state is close enough to the target state, the current state is set to the target state. The incremental updates from the current state to the target state can follow linear rate of change or can be specified by a function of either time or a normalized value between 0.0 and 1.0.

Figure 8:
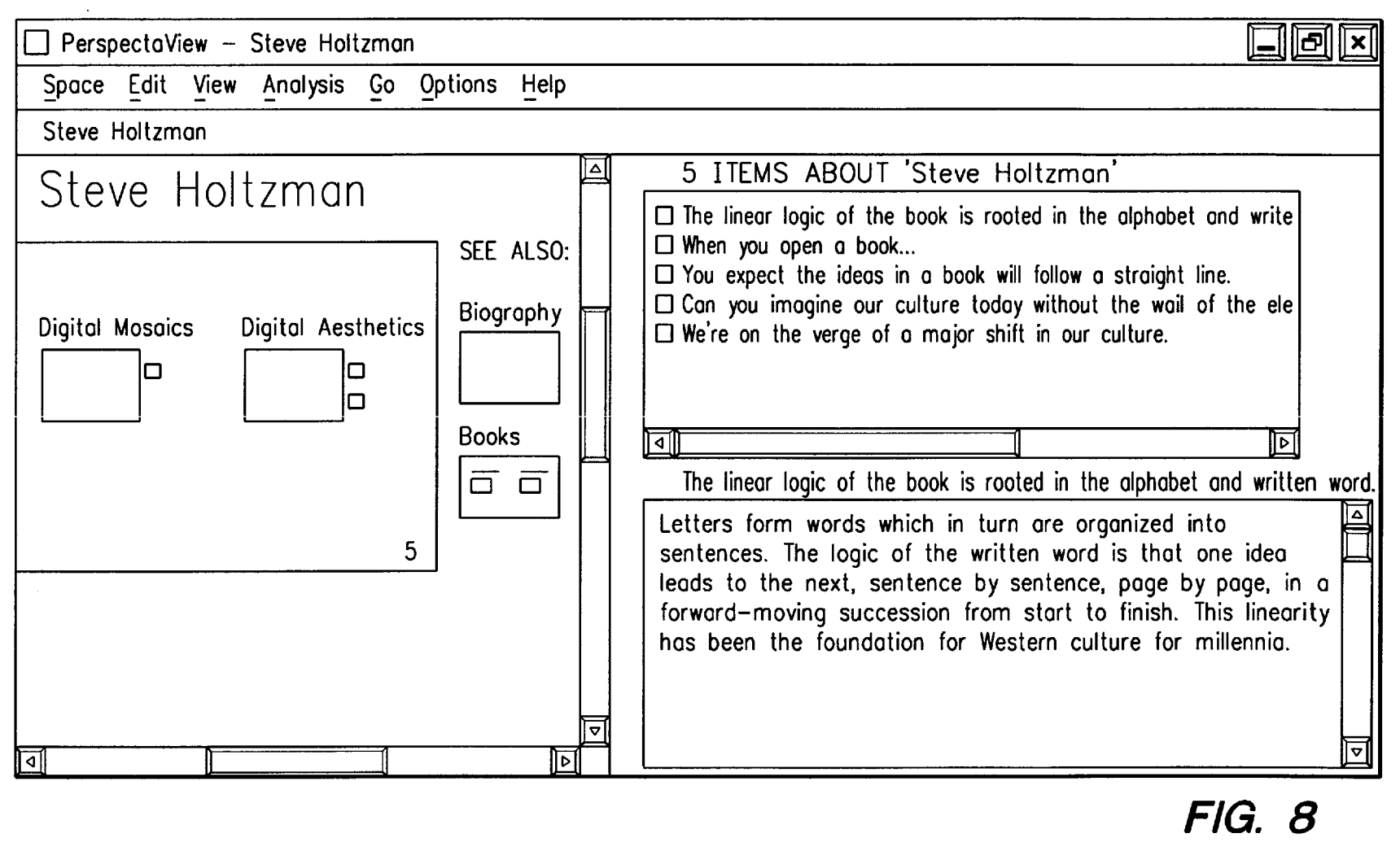

The final phase is the display phase. In the display phase, the structure of graphical objects is traversed and displayed depending upon their current state. A 3D parallel projected information space 200 with perspective scaling is achieved by computing the position and size of the graphical objects based on the user's position in the information space 200, as represented by the virtual camera 332, and distance of the graphical objects from the user as described above. In this display process, the scale of the graphical objects changes as a function of the position of the virtual camera 332 relative to the graphical objects and the mapping specified by the view 333. This scale function is applied by the display state 331. Using this scale function the space presentation 300 determines how much information is presented to the user such that the display area 221 maintains a constant amount of information density. FIG. 8 illustrates a sampler user interface 800 showing the 3-D space projection of the information space 200, and graphical objects with constant information density.

Appendix A

Dynamic Topic-Based Organization of Documents

I. Abstract

A system for organizing large document sets by creating graphs (tangled hierarchies) of Topic nodes is presented. Each Topic represents a subject (described as a set of concepts) and has a set of documents attached to it that are "about" the subject. Topics are connected via links that represent the semantic relationships between their subjects, such as conceptual generalization, refinement, and association (non-hierarchical "sideways") relations. The graph of Topics is created dynamically in response to a user query and a set of documents.

The graph has the property that for each Topic, a set of connected sub-Topics provides coverage over and distinction between the set of documents about the Topic. Thus, moving "downwards" (from Topics to sub-Topics) recursively in the graph is effectively refining a query: the sub-Topic is a more finely articulated conceptual description of the subject of interest, and there are fewer documents that "match" the sub-Topic.

II. Problem

As more information becomes available on-line, the problem of searching through it to find specific information is intensified. There are two general aspects of this problem:

finding a relevant document (or smaller set of documents)

understanding what a set of documents is "about" (a summary)

One approach to this problem uses traditional Information Retrieval methods (as at TREC) that focus on maximizing "recall and precision": return all and only the relevant documents to a query. The success of IR systems varies widely, usually performing acceptably only with restricted types (domain and style) of documents and with large queries (e.g. an example document as a query). Performance degrades considerably in the "search engine" case, where a query may be only a few words, and the set of documents is unrestricted (e.g. the entire WWW). In this case, large unmanageable lists of tens of thousands of irrelevant documents are usually returned. In addition, their is no mechanism for representing a summary of a set of documents.

A second approach (e.g. Yahoo) uses static Topic hierarchies as "containers" of documents: all documents are tagged (by humans or superficial text analysis) with labels that indicate what Topic category they belong in; users navigate through the hierarchy to find a particular Topic of interest and the associated documents. The problem with this approach is that the hierarchy is the same regardless of the user's query and the document set. Thus, it does not represent the document set (summary), and it is very inefficient for a user to find what they are looking for (they must manually trudge through the same hierarchy of Topics every time). Further, the system is limited in its applicability to those subject categories which its single hierarchy covers; it cannot dynamically leverage other sources of hierarchical information as needed.

A third approach uses statistical clustering algorithms to automatically group related documents together, thus avoiding the problems of static hierarchies that do not change for different queries and document sets. The problem with these systems is that the strong semantic relations between Topics (e.g. those in static hierarchy systems) which are useful for navigation are lost. Thus, there is no clear sense of semantic refinement between Topics, nor is it possible to know how different Topics are related; the result is that the interface to such a system is less consistent and intuitive.

III. Architecture

The system uses a combination of these three approaches to create interconnected Topic hierarchies dynamically in response to a user query and a document set. The preferred approach is implemented as follows:

A system that includes:

a) a database of documents tagged through Linguistic Analysis;

b) a Knowledge Base (KB); and c) a Structuring Process.

A client interacts with the system to provide user queries and output selected documents and topics.

A. Linguistic Analysis

1. Overview of Linguistic Analysis

Linguistic Analysis produces several Topic labels that represent what each documents is "about". Linguistic Analysis includes:

a) tokenizing, morphological processing, part of speech tagging, and phrase level parsing to extract Terms (nouns and noun phrases);

b) using frequency information to find a subset of these Terms that are statistically important in the document, c) matching these Terms with Topics in the KB;

d) performing disambiguation for ambiguous Terms (polysemous words that could refer to more than one Topic), preferably using a metric of "proximity in the KB graph" to other Terms in the sentence/paragraph/document scope;

e) creating new Topics in the KB for important Terms that are not already in the KB; and f) indexing documents in the database based upon these Topic labels.

2. Implementation Design of Linguistic Analysis

The system analyzes documents off-line to determine what the document is "about" and label it with the appropriate meta-data so that Structuring can access it efficiently. The boundary between what processing is done in Linguistics and what is done in Structuring may be determined as necessary for implementation efficiency. The main idea is to do Linguistic processing to extract all the information needed from documents into meta-info records in the database. Then the Structuring processes can take sets of meta-info records (representing documents) to build spaces (preferably in "real-time" when someone is using the system). The goal is to allow the Structuring processes to be free from dealing with the document itself: they just use information extracted by Linguistics.

In order for the Structuring algorithms to make use of Knowledge about Concepts in organizing the documents, each of the extracted entities (i.e. noun phrases) in the document must be connected with the corresponding Concept in the KB (the term Topic to refers to a Concept as a nodes in the information space as opposed to nodes in the KB). The KB provides the fixed vocabulary of Concepts that are the possible labels for "what a document is about"; it suggests the relevant basic-level terms to use as meaningful general categories to put documents in. The use of a fixed vocabulary is extremely valuable for indexing and retrieval systems, for it prevents arbitrary and inconsistent strings (which are difficult to use to find documents later) from being used (e.g. Library of Congress Subject Heading System) In addition, the KB specifies constraints on the generation of new Concepts (especially collocations) discussed in the document. Further it is desirable for Linguistics to allow Structuring to identify the Concepts that are being discussed independent of the particular words used, by removing the dependency upon word choice or morphological inflection of a word referring to a Concept.

In sum, Linguistics can be viewed as placing documents in categories (Concepts) or as putting labels (Concepts) on documents; these are the same thing. The description here assumes that Linguistics starts with plain text files as InfoObjects. A document gatherer is used to collect documents (e.g. retrieve them from WWW), parse their formats (e.g. PDF, HTML), and provide Linguistics with chunks of plain text (where each chunk is grouped according to what part of the document structure it is from). In addition, a full-text indexer is used to index documents that enter the system; this will provide a parallel route to those mentioned below for retrieving documents later. It is also preferable to use a document splitting mechanism to decompose documents into parts, for example according to a table of contents or other document structuring information. This decomposition may be done manually or automatically.

i) Tokenizing, Stemming, Part-of-Speech Tagging

Input: text stream

Output: series of weighted tokens, suffixes removed, tagged with a POS symbol

An IR model of token frequency and relative importance. The Brill POS tagger may be used to perform the tagging. Alternatively, the INSO tagger may also be used.

ii) Noun Phrase Parsing

Input: series of tagged tokens

Output: series of noun phrases

Using a simple English grammar to find possible NPs: a first pass groups together tokens into noun phrases (e.g. NP=noun*; NP=adj+noun; etc.); a second pass attempts to assign attachment of phrases to each other (e.g. assign direct/indirect objects, attach prepositional phrases). The KB contains argument role information for different verbs to help with this parsing.

The general goal is for Linguistic Analysis to use knowledge-guided parsing to determine the relationships between concepts discussed in the document.

iii) Lexical Unification With Knowledge Base

Input: series of noun phrases

Output: series of corresponding KB Conceptds

Here are the different cases that are encountered in the process of unification:

NPs that have a single mapping in the KB:
  In this simple case, a DB query is made for the NP as a Term in the KB and assign the appropriate ConceptId.

polysemous NPs (map to several Concepts in the KB):
  Attempt disambiguation via proximity search from candidate Concepts to other active Concepts appearing in the context surrounding the NP.

unknown common nouns (not found in KB):
  Make a temporary Concept (indicated by a status field) for the purpose of at least being able to determine co-reference with the same terms in other documents. To prevent too many unknown words in the KB, strict frequency thresholds are used before executing this pass.

unknown proper nouns:
  A Proper Noun recognizer may be used to identify unknown tokens. The recognizer should suggest whether the token refers to a Person, Place, Organization, or Product.

unknown noun phrases:
  As with unknown common nouns, make a temporary Concept (only for frequently occurring NPs—further, restrict here to only noun/noun and adj/noun NPs initially). Next, attempt to unify the parts of the NP (its component words) with Concepts in the KB. Next, find relation path between these constituents; this determines the relations that are assigned between the new Concept and the constituent Concepts, so that the new Concept is "linked" in the KB.

Annotation Enhancing

Input: all of the above information

Output: series of weighted ConceptIds that are implied topics of the document.

In addition to the above methods for literally extracting Concepts discussed by the document do determine what the document is "about", it is preferred to apply other algorithms that work with this extracted information to generate further Concepts that are good labels for the document. Here are some simple algorithms that may be used:

abstraction and clustering:

Given Concepts that the document is about, the document can be considered to also be about more general Concepts (supertopics) that subsume the explicitly mentioned Concepts (e.g. a document about "spaniels" is also about "dogs"). Stated otherwise, the KB relation of subtopic can be used to generate lists of terms which serve as evidence that a document expresses a more general Concept.

Clustering uses the same idea, but searches outwards in the KB from Concepts in the document to find points of contact (i.e. common Concepts) which can be given higher weights (e.g. a document that discusses Fords, wheels, tires, radios, dealerships, etc. can be also labeled with the Concept car).

query expansion evidence models

The method of query expansion used by Verity Topic-style programs is to translate a query term into a set of other terms whose presence in a document constitutes weighted "evidence" that the document is about the initial query term.

co-reference and weighing:

Determining correct co-references in cases of anaphora is a difficult problem. One approach is to obtain accurate counts of how many times Concepts are referred to; and then can the correct reference in analyzing clause-level relations between Concepts The two commonly occurring cases are pronouns (e.g. "There is Bob. He is neat.") and definite determiners (e.g. "Netscape is neat. The company is growing."). This approach is to using a simple metric of "assign reference to closest previous compatible type", which has about a 50% efficacy. In addition, KB synonym information may be used to determine co-referents, and to ensure that one Concept corresponding to several different terms in the document is weighted appropriately to reflect all of their occurrences.

deep parsing and summarization:

Alternate embodiments may use simple summarization by the technique of excerpting chunks of text in positions of high relevance, and then pruning off satellite clauses from these chunks.

When handling these linguistic issues, the KB may be used as a world model (and goal knowledge representation scheme) for building representations of the documents' content (e.g. entity-relation models).

B. Knowledge Base

1. Overview of the Knowledge Base

The Knowledge Base is a semantic network representing Topics, conceptual Relations between Topics, and Terms (lexical items) used to refer to Topics. The KB:

a) provides many-to-many mapping from Terms (word forms) to Topics (word meanings), allowing for polysemy and synonymy;

b) provides an application programming interface that projects any of its types of Relations into a smaller set that the Structuring process can use. The types of Relations include: refinement/generalization (taxonomic and conceptual subsumption/entailment) and association (common co-occurrence but not subsumption);

c) expands to include new hierarchies: contains many overlapping Topic hierarchies from different sources (e.g. Wordnet, Yahoo). Each Topic in each hierarchy is unified through a partially automatic and partially human process with conceptually matching Topics (evidenced by similar Terms and Relations) in the other hierarchies.

d) expands to include new Topics Terms and Relations automatically found in documents:

i) new Topics are made for important unknown Terms;

ii) association Relations are made for Topics which occur together in many documents;

iii) refinement Relations are made based upon linguistic criteria (e.g. the rule "a noun phrase is a taxonomic refinement of its head noun and a subsumption refinement of its modifying nouns" applied to the new Term "dog food" produces the Relations: "dog food" is a type of "food" [taxonomic refinement] and "dog food" is subsumed by "dog" [subsumption refinement]). This allows for the partially automatic large-scale extension of the KB to include a vast vocabulary and statistical information about which Topics are associated with each other.

e) includes a KB Management tool that provides a GUI interface for a human annotator to verify automatic additions and otherwise edit the KB.

2. Implementation Design of the KB

The knowledge base (KB) helps with three main areas of the system:

Linguistic analysis: POS tagging, parsing, and concept disambiguation

Structuring input: user's query expansion

Structuring process: finding/constraining/creating relations between Concepts

The KB is essentially a large collection of Concepts. For each Concept, there is stored the following information: a definition; a set of terms (and morphological information about these terms) that can be used to express it; a set of relations between it and other Concepts. In AI, this type of KB would typically be referred to as a "semantic network" with bindings to a "lexicon".

The KB is implemented as a set of tables in and access routines for a relational database.

A Knowledge Base Management Tool which allows for simple graphical is browsing and editing of all of the fields in the KB.

i) Relations Between Concepts

In principle, every relation between Concepts is reciprocal: for example, the relation "X produces Y" is reciprocated by the relation "Y is produced by X". (The exception to this rule is Attribute relations, which map from Concepts to literals.) It is desirable eliminate the redundancies of storing both of these separately, and simply store one version of the relation to represent both directions.

Each relation between Concepts is itself a Concept in the KB. For example, the relation "produces" (e.g. "Netscape produces Netscape Navigator") is a Concept in the KB, with terms and other relations. For example, "publishing is a type of producing" (note that hyponym (type-of)relations are somewhat different for nouns and verbs; for verbs, a better literal translation is "publishing is a manner of producing").

For Concepts that are also relations, the terms indicate what the appropriate inverse relation construction is. This also allows the system to represent arbitrarily specific relations in the KB, so that information is not lost when knowledge is entered into the system.

However, in one embodiment the Structuring Process and client only makes use of the most general basic types of relations between Concepts. In order to support this, there is also maintained a separate table (a DB RelType table) which stores the basic relations so that they can be readily accessed. Further, all instantiated specific relations that are entered into the KB must inherit from one of these basic relations; in this way, all relations that are entered into the KB can be of use to a module that only wants to deal with basic relations. Constructing the KB in this manner provide the infrastructure to accommodate a greater use of more detailed relational information as the Structuring and client become more sophisticated. For example, detailed relational information can be used by the client to further specify the appropriate layout and appearance of Concepts, or by Structuring to filter out different relation types to accommodate different user perspectives.

The basic relations are currently subclasses of two main types:

"X is related to Y" (inverse same): more specific types of this relation include: sibling relations (from common parents or common children); association relations where no modifier is carried over (e.g. "Netscape produces Internet Software"); statistical unlabelled co-occurrence relations (i.e. parents of intersections, or statistical associations).

"X is subtopic of Y" (inverse "is supertopic of"): this is a general parent/child relation, where the important defining factor is that more information is specified in the child than in the parent (e.g. a distinguishing feature, another modifying term, etc.). The more specific types of this relation include: taxonomic subtype relations; association related subtopic where a modifier is carried over (e.g. "Netscape produces Netscape Navigator"); meronymic part-of relations; statistical unlabelled dependence relations (i.e. intersections).

These are the distinctions between relations that are used in one embodiment of the Structuring Process and client; not all of these are used in the KB. The other commonly found relations in the KB (useful for hand annotation) are organized in an ontology within the KB itself, and can be examined there.

ii) Sources of Knowledge

The content of the KB may comes from several sources.

Wordnet

Wordnet is a freely available lexicographic research tool distributed by Princeton University. It consists of a large lexicon (roughly 100K terms) of concepts (called synonym sets in WN, for they are defined by the collection of words that express them, as in any thesaurus), and taxonomic relations between these concepts. Wordnet's coverage of the English language in general is very broad. The main organizing relation is hyponymy (the "is-a" relation, which is here called "subtype"); in the true spirit of taxonomy, every concept is considered to be a specialization of a more general concept (child=parent+distinguishing feature), and inserted into the hierarchy accordingly.

In one embodiment, the concepts in Wordnet serve as the foundation of the KB. In other embodiments, other lexicographic resources, such as Roget's Online Thesaurus and online encyclopedias, are integrated with Wordnet as well.

Mikrokosmos Ontology

The Mikrokosmos Ontology is a freely available resource, developed at CRL as the knowledge component of a knowledge-intensive machine translation project. It consists of small-medium (roughly 6K concepts) collection of general world knowledge concepts (with a specialization in the domain of corporate mergers and acquisitions) and the relations between them.

One embodiment uses Mikrokosmos because of the richness of explicit association relations it provides between world knowledge concepts.

Online Categories

Web sites which categorize information through hierarchical subject-based collections of pages are becoming increasingly common. The larger of these (e.g. Yahoo, Galaxy, etc.) effectively constitute "ontologies" wherein each page represents a subject (which maps to "Concept"), provides information about this subject (such as a collection of documents about the subject, and perhaps a definition), and relates the subject to more general (abstract) and specific subjects.

To incorporate online categories, it is preferable to use a crawler to download all of the pages from the site of interest. The desired information (e.g. ontological information) is extracted from the HTML, and saved in a knowledge base object. These objects are unified with the Concepts in the KB.

In one embodiment it is preferable to use Online Categories because they offer alternative dimensions of abstraction to standard taxonomic relations, and because they provide information about "real-world" concepts (e.g. companies) and domain specific concepts which Wordnet and Mikrokosmos do not cover.

Hand Knowledge Annotation

There are four main areas in which Hand Knowledge Annotation is desirable:

to review and correct the automatic KB building/unifying processes;

to add labels to unlabelled relations (e.g. from Online Categories);

to create particular chunks of a KB for a customer:

to enter an area of specific domain knowledge (e.g. from an expert) that is not recorded anywhere in a form that can be input automatically.

Partially Automated Generation

For customers that need specialized knowledge related to their domains, it is useful to develop a few simple utilities to case the acquisition of this knowledge: a utility that finds commonly occurring unknown noun phrases in a typical sample of the customer's documents, and puts these in a buffer for a human to add to the KB in the right place; a utility that takes lists of terms under headings in a simple file format and inserts these into the KB awaiting further human specification.

Unifying Knowledge Sources

In a preferred embodiment, the system combines the information from these different sources to form one unified KB. For example, the KB should respond to a request for all of the children of the Concept "computer", by providing the union of Wordnet's, Yahoo's, etc. subtopics. It is preferred not to have multiple entries for the same Concept or relation between Concepts. Overall, the knowledge in each KB is made much more valuable if it can be linked to the other KBs.

In order to perform the unification from these different sources, one embodiment uses an algorithm that attempts to automatically determine which Concepts in source A map to which Concepts in source B. The algorithm uses as evidence for a match the gradated results of comparisons between the names, definitions, and lists of related Concepts between A and B. After initial automated unification, the KB is reviewed by a human operator to provide the final selection and unification of concepts from the disparate knowledge sources.

C. Structuring Process

1. Overview of the Structuring Process

The Structuring Process (also called space-building) generally means:

Given a set of documents (or a query from which to select a set of documents), create a Space (a graph) of Concepts that permits navigation of the set of documents. Each Concept node in the space indicates what information is available about that Concept (i.e. what the system understands about the information) through the presentation of related topics in space; this effectively defines the local "vocabulary" the user has for indicating the next step in the "dialog".

Structuring is the system's ability to organize information. The information spaces (or simply "spaces") resulting from the Structuring Process assign coherent and consistent meaning to the relative positions of Concepts in the space. Unlike fixed category schemes, the resulting Spaces are dynamically constructed to reflect the Concepts discussed by a specified document set; only Concepts discussed in the available documents are shown in the Space. Automatic categorization of documents in a Space enables visualization of the Concepts.

The main process of Structuring involves recursively finding common Concepts that can group documents to provide coverage over a document set, and finding subtopics of these that provide distinction between these documents to yield smaller document sets. The KB provides constraints on what Concepts can be used to group other Concepts, and what Concepts can be used to subdivide other Concepts. In order to provide good organizations of document sets, knowledge is required; the structure of the space must be consistent with general world knowledge.

In one embodiment, the Structuring Process builds a Topic graph for a set of documents in response to a user query. The Structuring Process includes:

a) using the Topic labels derived from Linguistic Analysis to retrieve relevant documents and initial Topics;

b) using the KB to expand the query and constrain the choices of Relations between Topics in building the graph; and c) selecting the set of Topics that most efficiently organizes the documents by recursively creating sub-Topics that provide coverage over and distinction between each Topic's documents.

The benefits of this system and its resulting Topic graph include:

1. The graph contains only those Topics relevant to the document set and user query, and useful for dividing up the documents efficiently.
2. Topics in the graph are consistently semantically related, allowing a user to follow a "train of thought" through connected Topics.
3. The query can be small (a word or two): the graph will include all documents possibly relevant to the query, allowing the user to refine the query by selecting Topics that increase the precision.
4. The graph is a representation of the document set, effectively providing a "summary" at each Topic level of the main sub-Topics discussed in the documents associated with that Topic.
5. The graph includes the relevant and useful sub-graphs from any number of existing hierarchies which are combined in the KB, allowing for broad coverage.
6. The graph includes new Topics generated to further refine Topics for which there are no refinements the KB (see below).

The three major operations performed by Structuring are:

i) Finding Documents That Match a User's Query

This involves searching the document DB after a user has typed a simple initial query to indicates the area of interest. The set of documents can also be constrained with a more traditional "select" on standard relational fields (e.g. date, author, source).

Input: query

Output: set of documents

The KB helps by broadening the query to extend the set of documents that are matched (recall), as well as pruning the possible interpretations of the query to avoid false positives (precision). For example: if the query consists of more than one term, the KB can aid in parsing it, as in Linguistics, the pruning can also occur by similar disambiguation to that done in Linguistics. Each query term is expanded to include morphological variants, synonyms (standard thesaurus information), subtypes ("animals" is extended to "dogs"), subparts ("dogs" is extended to "paws"), subtopics of the query term ("computer" is extended to "computer software"), Concepts related to query term ("netscape" is extended to "internet"), etc. In other words, all the KB Concepts which are related to or subsumed by the query term are also included in the search, so that it needs not rely on matching an exact word, but can instead match the general concept of interest.

ii) Organizing the Results in a Structured Space

This involves actually building the space that represents the document set. This is the main function of Structuring.

Input: set of documents' meta-data (sets of doc-Concepts); optional query-Concepts Output: a Space The Structuring process builds the space by finding the smallest set of Concepts that can categorize all of the documents that match the query, and that represents the content of these documents (i.e. the Concepts and Relations they discuss). The Knowledge Base provides information about how these Concepts can be organized in the Space according to their semantic relations, to produce a "reasonable" arrangement of topics (which documents go together in which categories, what Concept names are coherent for categories in a context, which Concepts are conceptually contained by other Concepts, which Concepts are generalizations of other Concepts; in general, how two Concepts semantically relate and should be placed relative to each other in the Client layout, etc.). This knowledge is combined with the results of Linguistic analysis to represent how documents and Concepts are related.

The output of Structuring is a Space with a structure that serves both to organize the documents that match the query into smaller coherent sets (to allow for progressive refinement of the user's search for particular information), and to inform the user about Concepts and Relations between them.

The problem, therefore, is one of automatic categorization of documents: putting documents in the right categories, and putting subcategories in the right categories.

The Structuring algorithms require Knowledge to give the user a coherent set of choices at each stage in the dialog with the system, as the user articulates their request (through their gestures of moving towards the Concept of interest) with greater specificity. Movement in the Space accumulates a context that constrains what can be shown at deeper levels; the choices a user has when deep in the space reflect the choices the user has made to get to this point (as would be the case in any "dialog").

The general criteria for a Space are as follows:

similar documents and subtopics are clustered together: topics group similar things topics should allow for progressive disclosure of information from general to specific topics should have links to all related information (related topics) to the topics, with each of these related topics being positioned consistently in the space (in terms of the type of relation to the current topic)

topics should be at the proper level of generalization to indicate what the document set discusses: the set of top level topics serves as a summary of topics addressed by the document set the resulting space should be well balanced, and should use coherent and useful terms (such as basic level terms; avoid terms like "bureau"); the space should have minimal depth, given a maximum branching factor minimize the degree to which topics imply that the documents discuss things that they do not actually discuss topics should provide coverage over the documents and distinction between documents based on the choice of topics; the Space should have nodes to distinguish between arbitrary document set sizes (e.g. a user can specify a threshold: they always want to have distinguishing subtopics available whenever there are more than X documents about a topic)

The query-Concepts reflect constraints on what Concepts should appear on the top of the Space; subtopics are chosen for the rest of the Space that relate to these query-Concepts. The query-Concepts are initially simply the Concept-unified words that the user specifies in an input text query; however, the construct is generalizable to take into account other top-level constraints on the space, such as user profile information (a set of Concepts that a user always wants to see at the top of the Space), customer specific layouts (an "upper Space" that fixes certain Concepts in certain positions and allows the algorithms to "flesh out" the Space beneath these), etc.

The doc-Concepts are the set of Concepts from the document meta-data; these are the Linguistics labels of what each document is about. Structuring can be seen as the recursive process of finding those nodes that are the intersection of the nodes related to the current Concept (initially the query-Concepts) and those related to the doc-Concepts.

a) Algorithms

Abstractly, the main algorithm for Structuring consists of selecting the relevant subgraph of the KB to hold the documents, and collapsing (eliminating) unnecessary intermediary links between nodes. This involves two phases: 1) search upwards from each doc-Concept to more general Concepts to find common parents that can be reified as nodes in the Space; 2) search downwards and outwards from query-Concepts to more specific Concepts to find nodes that efficiently divide the set of documents into categories; in-between Concepts that are not branching points are removed (e.g. not put in a Space as a Topic). The Space is a tangled web of interconnected links (not a strict hierarchy);

this allows "chunks" of the KB to appear (i.e. be accessible from) many different places. In addition to this Knowledge based Structuring on Linguistic meta-data, the central Structuring algorithms may be extended to take advantage of extra-linguistic information, such as hyperlinks in the documents.

In the top-down part of building a Space, there are some Concepts that have no further subtopics in the KB; this requires that the system "generate" new Concepts to further subdivide the documents related to the current Concept (if necessary to accommodate user's threshold. (The depth of the Space can be dynamic as appropriate for the document set). The goal is to have as many different nodes as necessary to distinguish between the documents and as few as necessary for covering the topics discussed by the documents. In these cases, Structuring examines the set of Concepts which the bottom-up algorithms have selected (which divvy up the documents) and try to find "paths" in the KB between these and the current Concept. (This is effectively trying to find relation labels for the co-occurrence associations between the current Concept and the bottom-up Concepts.) Structuring computes the cost of a path through KB according to weights on relation types; this allows Structuring to avoid semantic anomalies (e.g. "cat dog") while producing coherent nodes (e.g. "pet dog"). Structuring then generates new nodes for the set of shortest paths that provide the desired coverage and distinction over the documents about the current Concept. For each of these nodes, Structuring uses a label-generation routine to indicate how to correctly combine the constituents into a well-formed term (e.g. "A produces B" generates "A[possessive]B").

Upon completion of full phrase-level Linguistics parsing, Structuring will be able to use the internal structure of the parsed NPs to determine the nature of the relations between the constituents. The relation paths will allow Structuring to find and distinguish between otherwise confusing ambiguous intersections. For example, Structuring would be able to identify whether "music" and "computers" are co-occurring in the context of "computer music" or in the context of "people who like both computers and music"; Structuring would also be able to generate the right Concept label that puts the modifier in the right place. In the absence of this, Structuring can still use unlabelled information from a statistical analysis on a portion of the space that is not well mapped out by knowledge, thereby taking advantage of statistical processing to handle new things that are outside of the fixed domain of the knowledge base. The statistical approach starts with all the co-occurring frequent words found in the documents and uses the statistically independent ones as the more general topics in the space. The resulting space has top-level terms that are the starting points of trees where the nodesterms at each level indicate that documents beneath that node contain intersections of the current term and the previous terms up the tree. Overall, combining knowledge with statistics can be useful in cases where there is a consistent knowledge domain but a variation of numerical or other isolatable values within the organization. The knowledge part is important for organization and presentation, the statistical information is important to filter information before it gets to the organization stage.

iii) Updating the Space

There are several cases in which Structuring will need to compute an update to an existing space:

When new documents are added to the database, these need to be placed appropriately in the Space. If many have been added, Structuring needs to recompute the Space so that its organization reflects the new availability of documents.

The user can simply enter another text query term at any point and the system will create an intersection of this and their current results, using the path finding algorithms to attempt to relate the current Concepts to the new search term.

The user may want to indicate that a portion of the Space should remain the same, while another portion is recomputed.

2. Implementation Design of the Structuring Process

In a preferred embodiment, the Structuring Process includes the following steps:

1. The user query indicates what documents to build the graph around:
   a) The query can include Filters, such as a simple relational database select statement upon any field of the document record (source, author, date, full text index).
   b) The query can include Terms for Topics in the KB. The system automatically expands the query to include all Topics that have KB association or refinement Relations to the query Topics. For example, the term "dog" is expanded to include "leash," "spaniel," and the like. The expanded set of Topics is matched against the Topic labels that documents are indexed on.
   c) The query can comprise several Terms and Filters which specify top-level nodes in the graph. The rest of the automatically created Topics will attach to this top level.
   d) The query is executed to retrieve the matching documents and their Topic labels.

2. A bottom-up phase selects all the possibly relevant Topics from the KB:
   a) For each of the document Topic labels, all of the Topics connected by association and generalization Relations in the KB are retrieved, recursively.
   b) This effectively selects a sub-graph of the KB that includes all known abstractions of the document Topic labels.

3. A top level set of Topics is selected to provide coverage over and distinction between the matching documents:
   a) If the user query included Terms for Topics, use these Topics as the top level.
   b) Otherwise, choose the top level set of Topics from the most abstract Topics in the KB sub-graph.

4. A top-down phase recursively creates sub-Topics of these selected Topics, dividing the documents into smaller sets:
   a) For each Topic, evaluate whether the sub-Topics connected to it via refinement Relations cover a smaller set of documents.
   b) Choose the smallest set of sub-Topics that provides coverage and distinction.
   c) Eliminate Topics that are not part of this set (e.g. alternate refinements of the Topic from the KB subgraph).
   d) Compress the chains of Relations between Topics as necessary. For example, if the KB has refinement Relations between the Topics "animal" and "dog", and then between "dog" and "spaniel", but all of the documents about "dog" are also about "spaniel" then the "dog" Topic is removed and "spaniel" is connected directly to "animal". This ensures that the Topic labels are always as specific and relevant as possible.
   e) Recursively proceed until each Topic only has a specified maximum number of documents attached to it, and needs to be divided no further.

5. New sub-Topics are created to divide the documents associated with Topics for which the KB has no refinement Relations to possible sub-Topics.
   a) New sub-Topics are created as intersections of existing Topics: other Topics that have partially overlapping attached document sets are combined with the "unrefinable" Topic.
      For example, if there are no refinements of the Topic "spaniel" in the KB, but there are more than a specified maximum number of documents attached to it, and if the document sets attached to other Topics such as "shedding", "adoption", etc. are partially overlapping with the document set attached to "spaniel", then sub-Topics of "spaniel AND shedding", "spaniel AND adoption", etc. are created, such that the intersection is a refinement sub-Topic of each of its constituents, designating a more specific subject with fewer documents attached to it.
   b) Topics that have associated Relations in the KB are preferred for the creation of intersection sub-Topics, such that the resulting sub-Topic is a semantically related compound to the Topic. In cases where there are also no useful associated Topics, any Topic can be used.
   c) Intersection sub-Topics are themselves recursively further refined as needed by refining either of their constituent Topics, or by intersecting with another Topic.

Recursively proceed until each Topic only has a specified maximum number of documents attached to it, and needs to be divided no further. Intersection sub-Topics are themselves recursively further refined as needed by refining either of their constituent Topics, or by intersecting with another Topic.

D. Information Spaces

Spaces are now interconnected graphs (overlapping hierarchies) of Topics connected by TopicLinks, starting at Static Upper Level roots. Each TopicLink relates two Topics using a pre-defined RelationType. Each Topic has Labels, consists of several Focus Elements, and can have Multiple Parents.

1. Topics

Each Topic effectively serves as an expression of a "query" or "select statement" on a set of documents. The Topic is defined as one or more Elements which each restrict the set of documents that are "contained by" that Topic; the Topic contains that set of documents that is the intersection of the sets contained by its Elements.

Each primitive Element is either a Concept from the Knowledge Base (e.g. dog) which selects InfoObjects that Linguistic analysis has labelled as being "about" that Concept (content meta-data), or a Filter (e.g. source=Mac Week) that selects a set of InfoObjects based on their file meta-data (e.g. date, author, source, keywords assigned by author).

For example, a Topic could be "documents from June Macweek about computer chips and democracy" where "June" and "Macweek" are Filter Elements and "computer chips" and "democracy" are Concept Elements.

In one embodiment, it is desirable to have each possible Filter itself be a Concept so that these types of Elements may be unified. In the rest of this document, "Concept" is used to represent all types of "Elements".

In some embodiments, Topics which are "unions" of Concepts may be used instead of "intersections", as when a user asks for documents from June and July.

TopicLinks specify a change in a Concept in a Topic. Movement between Topics (via TopicLinks) in the Space graph entails either adding an Concept, removing an Concept, refining an Concept, generalizing an Concept, or changing (swapping) one or more Concepts. These break down into three categories of "narrowing" (subtopics), "broadening" (supertopics), and "jumping to some other place" (associated topics). Each of the types of movement has distinct semantic properties, and is represented by a different RelationType for the TopicLinks.

On the level of the Conceptual Model for the Space Structure, these movements define the discrete gestures that the user can make in the discourse with the system. Therefore, movement in the graph entails modifying an evolving "context stack" of Concepts.

2. RelationTypes

The system architecture is set up to accommodate an unlimited variety of RelationTypes. A mapping from these RelationTypes to a smaller pre-defined set that the client is prepared to meaningfully display is preferred to enable reuse of a client with new RelationTypes.

One set of RelationTypes includes 8 relations, divided into the 3 categories of sub, super, and associated topics.

The RelationType between a source Topic and a destination Topic reflects the semantic relation between these Topics, and the relationship between the document sets associated with each of them.

Not all RelationTypes will be available at each Topic.

i) Subtopics

A subtopic represents a refinement of the document set, a specialization of the source Topic "query". Therefore, subtopics match the "container" metaphor of the client: each subtopic's document set is "contained by" the source Topic's document set; the destination Topic is conceptually contained by the source Topic.

The basic idea is that if a document is "about" a subtopic, e.g. jazz, that entails that it is also loosely "about" the supertopic music. The three different kinds of subtopics listed here reflect different ways in which a user could think of refining the topic of interest. The types of subtopics include:

subtype subtopics: RLTN_SUB_TYPE: "sub-type"
      music ->jazz
      software ->business software
      dogs AND music ->dogs ANDjazz These are examples of taxonomic refinement of an Concept along an IS-A dimension.

related subtopics: RLTN_SUB_RELATED: "sub-related"
      music ->music clubs
      car ->engine
      business ->business software
      dogs AND music ->dogs AND music clubs These are examples refinement of an Concept area of interest to a more specific Concept that is not a subtype. This may be used to define part-of or member-of relations, and typically involves using the current Concept as a modifier of another Concept (although in some cases, the modifier is implicit, e.g. car ->[car] engine).

(Note that the resulting Concept is still one unified Concept in the Knowledge Base that has a particular meaning (though it combines other Concepts); as opposed to intersection subtopics, which can combine two separate Concepts but do not form a single unified Concept.)

intersection subtopics: RLTN_SUB_INTERSECTION: "sub-intersection"
      music ->music AND clubs
      UNIX->UNIX AND database
      dogs AND music ->dogs AND music AND clubs These are examples of addition of a further Concept to the Topic.

This is how the "filtering" examples is preferably handled: given a set of documents about a certain topic, a new topic (e.g. a filter for database products) is added as an "intersection" to further refine the document set. The new topic can be of unknown semantic/conceptual relation to the current topic.

ii) Supertopics

A supertopic represents a broadening of the document set, a generalization of the source Topic "query"; these are simply reciprocals of the subtopic relationships. The types of supertopics include:

supertypes: RLTN_SUPER_TYPE: "super-type"
      jazz ->music
      music clubs ->clubs
      dogs AND music clubs ->dogs AND clubs
    related supertopics: RLTN_SUPER_RELATED: "super-related"
      music clubs ->music
      dogs AND music clubs ->dogs AND music
    un-intersections: RLTN_SUPER_INTERSECTION: "super-intersection"
      music AND clubs ->music
      music AND clubs ->clubs iii) Associated Topics An associated topic or related topic is a Topic that is generally related to the source Topic, but not in a strict generalizationspecialization sense. Conceptually, it is "to the side" of the source Topic. These RelationTypes may be understood as "See Also", or "Discovered Associations", etc. They will be "warps" to other parts of the Space graph, as opposed to subtopics and supertopics, which move along more consistent hierarchical dimensions.

In some cases, associated topics may be siblings (having common parents, or common children), but not always. (In some case associated topics may have common parents in the Topic graph, because they will represent some overlapping documents, but they may not necessarily have common parents in the Knowledge Base Concept graph.)

The types of associated or related topics include:

discovered associated topics: RLTN_ASSOC_DOC: "assoc-doc"
      Microsoft ->Explorer
      dogs AND Microsoft ->dogs AND Explorer This is a swap of Concepts that are strongly associated in the document set for the Space. These serve as a representation of the "content" of the documents, of what the document set "says". Initially, these may be determined by statistical co-occurrence; alternatively, the may be the result of deeper parsing towards "text understanding", with the goal of being able to represent the "way" in which the Topics are associated (e.g. "Microsoft produces Explorer"). This deep level of analysis is similar to semantic summarization.

knowledge base associated topics: RLTN_ASSOC_KB: "assoc-kb"
      markets ->products
      dogs AND markets ->dogs AND products This is a change of a Concept with a Concept that the Knowledge Base considers to be strongly associated. This is the mechanism through which system developers can add specific knowledge to link associated Topics.

3. Focus

A Topic can be composed of many Concepts, and any one of these may be the "subject" of the relation to a destination Topic. The subject of the relation the "Focus". Among other things, this allows the system to indicate which of several intersecting Concepts in a Topic are to be further refined.

For example, from "computer companies AND jazz", there are following different subtopics:

->computer companies AND bebop (reltype=subtype subtopic, focus=jazz)

->Apple AND jazz (reltype=subtype subtopic, focus= computer companies)

In some cases, it might not be meaningful to say what is the focus:

->computer companies AND music AND food (reltype= intersection subtopic, focus=[any])

The thrust of Focus is around supporting changes of Focus between different Concepts within one Topic, as in the above examples. In addition, it is desirable to implement changes of Focus within one Concept to indicate what part of the Concept is being modifiedrefined, as in the following:

->portable computer companies AND jazz (reltype= subtype subtopic, focus=computer)

->California computer companies AND jazz (reltype= subtype subtopic, focus=companies)

This can be difficult, because many semantic anomalies are possible when "mixing and matching" terms within a topic; e.g., refining on pan in pan flute would be inadvisable.

4. Multiple Parents

Every Topic can now have multiple parents, ie. supertopics.

These can be partially distinguished based upon Focus and RelationType.

For example, from "computer companies AND jazz":

->jazz (reltype=un-intersection supertopic, focus=jazz)

->computer companies (reltype=un-intersection supertopic, focus=computer companies)

->computer AND jazz (reltype=related supertopic, focus= computer companies)

->companies AND jazz (reltype=supertype supertopic, focus=computer companies)

->computer companies AND music (reltype=supertype supertopic, focus=jazz).

Appendix B

A Scaleable Camera Model for the Navigation and Display of Hierarchical Information Structures 1. The Problem Hierarchies are powerful organizations for capturing underlying order among data objects, but are difficult to display such that humans can easily understand their overall organizations and traverse them in order to locate desired data objects. (It should be noted that the term "hierarchy" here loosely includes the more general "graph" structure of which the hierarchy is a special type. This looseness is useful because even when a context applies to the general case, the hierarchy will still be the most important case. When the distinction is important, the discussion will make it clear.)

A. Traditional Hierarchical Displays

1. Outline Mode

Microsoft's "Window's Explorer" is an example of an attempt to display such a is hierarchy (in this case, a hierarchical file system), and allow users to traverse and manipulate it. Most word processors offer an outline mode view which is a powerful feature allowing writers to visualize and work within a hierarchical document. Outline mode works fine for small hierarchies but becomes difficult and tedious for large ones. The problem is even more difficult for other non-hierarchical graph structures.

2. Absolute Coordinates

Another approach is to model and display hierarchical containment as self-similar branches of ever smaller scale within two or more dimensions. Display and navigation techniques then allow users to magnify and expand regions of interest to both visualize overall structure and to find data objects of interest. This sort of multi-resolution visualization can be seen as either the ability to manipulate and scale the data structure, or as the ability to translate and scale one's point of view. Both are equally valid and equivalent ways of looking at the same operations.

Pad+ is an example of a system using this technique in two dimensions. Graphical data can be scaled to any size and placed anywhere within a continuous 2D space. The user can expand, contract, and pan around to view any part of the space at any scale. Pad+ was not designed specifically to support hierarchical information structures, but it does not preclude it.

i) Problems With Absolute Coordinates a) Modeling

Perhaps the biggest problem with modeling hierarchies in absolute coordinates is the difficulty of maintenance. For any object to be placed in a hierarchy, it must be assigned coordinates placing it rigidly within that structure. It is the equivalent to modeling a house brick by brick. It is not enough to simply state where the house is to be placed, one must determine where every brick goes. This rigidity also makes it difficult to alter hierarchies once they have been created. So as with placing a house, moving a house entails providing new coordinates for each brick.

b) Numerical Instabilities

Even though it is mathematically simple to think of a system that allows absolute coordinates to be computed within a hierarchy, in order to be used on a typical computer, those coordinate values must be stored with some finite precision. As the number of levels in a hierarchy grow beyond even a moderate number, even double precision numbers quickly run out of resolution to adequately represent numbers at very different scales. True, there are ways to store numbers with arbitrary precision within computers, but the cost in additional memory and especially in processing time is usually prohibitive.

3. Relative Coordinates

Relative coordinate modeling means describing each object in its own coordinate system and then using or instancing them wherever they are needed in the overall structure. At display time, each instance of an object takes its scale, position and possibly other attributes from its parent. This is a very powerful and common technique in computer graphics. Its greatest power is in its flexibility since moving or reparenting a node simply involves moving or transforming a link. The results of such changes are only observed at display time.

The use of relative coordinates also helps greatly with the issue of numerical precision. Each object can be modeled using the full range of numerical precision. It is only when extremely large and small objects must be rendered in the same coordinate system that numerical problems creep back in. Usually, there is plenty of precision available in traditional single and double precision numbers to have the added luxury of modeling each object in terms of the most natural units for those objects: feet or meters for human scale objects, Angstroms for molecules, etc.

Of course most problems resulting from the choice of coordinate systems can be worked around, but there is value in choosing the right solution for each need.

B. Non-Hierarchical Structures

So far this document has only discussed strict hierarchical models (i.e., true trees). It is often very important to be able to represent, display and navigate more general graph structures which may contain loops. Such structures would be impossible to represent completely in absolute coordinates. To see this, imagine a node A that contains node B. Being a sub-node, node B (or a copy of it) would be need to be modeled smaller and contained within node A when using an absolute coordinate system. If node B also contained node A, then it would need to contain a smaller copy of A that would contain an even smaller copy of B, ad infinitum. In a system which displays only a portion of a general graph at a time as a user navigates from node to node, a relative coordinate system is the best choice since copies of these nodes at varying scales would never need to be produced. The camera could descend from A into B and then deeper again back into A as many times as desired.

II. Architecture of Solution

The key insight to this solution is in the combination of three techniques:

1. A camera restricted to always face along a fixed vector but free to pan and zoom,
2. The use of a relative coordinate system of bounded sub-spaces, each one completely containing its children (with the assumption that the camera transitions between spaces by entering or leaving these bounded spaces), and
3. A camera volume which shrinks (or spaces which expand) in proportion to the camera's depth within its current space.

Of these three techniques, perhaps only the last one (the scaleable camera) is new, but the combination of all three is what is particularly useful, novel and non-obvious.

Restricting the view direction vector largely helps users from becoming "lost", and provides a uniformity of display that helps guarantee that the display makes sense at all times. In the current implementation, a three-dimensional space is used in which deeper levels of a hierarchy always appear further behind the display surface than shallower levels. A perspective effect is achieved by scaling objects smaller in proportion to their depth in the current display, The navigation technique models the user as being at a certain position and of a certain size within the display, so objects appear smaller the further they are in front of the user, and objects behind the user are not drawn. The current implementation uses a parallel projection, though this technique should work equally well using perspective or other projections.

The use of relative coordinate systems is important for several reasons:

It avoids numerical instabilities that would otherwise make it difficult to model hierarchies of arbitrary depth.

It makes it possible to model an arbitrary node independently of any ancestors.

It makes it possible to modify any part of a hierarchy without having to recursively apply transformations throughout that part of the hierarchy.

In addition to the use of relative coordinate systems is a containment model important to display and navigation. Although each node carries with it its own coordinate system, a useful restriction is the assumption that everything it contains will not extend beyond a certain range—in this implementation, a unit box. This restriction is important for two reasons:

It allows for the display-time culling of complex regions of the model which are outside the current viewing volume, and It clearly delineates a spatial domain for each node so even though the user moves through a continues information space, it is always clear where they are in terms of node traversal. That is, the user is always clearly physically in the scope of exactly one node.

This architecture also supports the treatment of non-hierarchical graph structures which is important because not all useful organizations of data can be captured in strict hierarchies. It is the use of relative coordinate systems that makes this possible since it becomes simple and natural make any node appear to contain any other related node even where the semantic relationship is not one of strict containment. As described in the previous section, two related nodes may each contain the other so that the resulting display gives a "hall-of-mirrors" or "infinite recursion" effect that would be very difficult to achieve with a model based on an absolute coordinate system.

III. Method

The essential components of the system are the nodes (topics) and the camera. Each node represents a complete and bounded information space consisting of information directly relating to that node (title and other graphical annotation, plus data objects), plus a set of related sub-spaces (other nodes). The camera represents the user's point of view that is always located in the space of one particular node (called the current node or topic), and which can move from node to node by entering related sub-spaces or backing up into previously visited spaces.

Although there can be many different ways that one node can be related to another, these relations can be categorized into two basic types: Those relations that represent complete containment—such as part-of or is-a relations—called "subtopics", and those that do not—called "related" topics. This distinction is very useful in that the display can use knowledge of this distinction to infer and display the user's context within a space. When the user moves from one topic to a subtopic, they are narrowing the scope of their context, which can be displayed as a refinement stack of topics. Traveling to a related topic, on the other hand, takes the user to a completely new space and generates a fresh refinement stack. Another interesting type of related topic is the "parent" relation. Any given topic can naturally be contained by several different topics simultaneously, and those parent topics can then be represented as a type of related topic within the given topic.

The user can drive the camera forward, back, left, right, up and down simultaneously, and the volume of space displayed at any time is centered on the position of the camera. An important feature of this method is that the size of the volume of space displayed is proportional to the distance from the camera to the back wall of the topic space in which the camera is currently navigating. Another important feature is that the speed with which the camera moves is also proportional to that distance. This way the user can drive continuously forward, yet never reach the back wall. The very act of moving forward (deeper) into the space therefore gives the effect of spatial refinement, while moving backwards becomes spatial generalization. Sub-spaces and other objects positioned against the back wall of a topic will appear to grow and shrink much like the effect of expanding and contracting in infinitely stretchable sheet. An important feature of this method is that objects can be placed anywhere within a space (i.e., not only against the back wall) making the model appear within an infinitely expandable three-dimensional space instead of simply on a two-dimensional sheet.

IV. Data Model

The following description only describes the current reduction-to-practice and only serves to describe one possible implementation of the Scalable Camera design.

The system components comprise:

A scene graph, also called a "space",

Graphical objects representing instances of nodes of that graph, and

A camera.

A. Scene Graph

A scene graph can represent any information organization to be viewed. Each node in that graph represents a topic. A related structure is constructed in the display system which consists of graphical instances of those topics. These graphical instances are used as the nodes of a 3D display hierarchy. They contain several important pieces of data:

1. A reference to the graph node that they represent (for access to title, summary and other features to display),
2. Size and positional data placing the node within the coordinate system of its parent, and
3. Zero or more child nodes.

A more flexible version which is currently not implemented would not have a graphical topic's size and positional data stored within that graphical topic, but would instead have that data simply be associated with it and stored within each parent that contains that graphical topic.

The fundamental operations on a graphical topic are:

1. The ability to arrange, or "layout" the children and other graphical elements of chat topic,
2. The ability to render those graphical elements onto a display given a display context defined by a viewing camera, and
3. The ability to select graphical elements from within the displayed region of the topic given a display context plus a selection point or region on a display.

B. Unit Box

The fundamental, low-level data structure on which the implementation is based is called the "unit box" which simply contains the position and size information mentioned above. In a more general 3D graphics system, this information would normally be captured in transformation matrices, but due to the restricted nature of the camera motion and the fact that graphical sub-spaces are never rotated, a much more compact and efficient representation can be used. Implicit in the relative coordinate systems that unit boxes represent are the bounds, or limits of these sub-spaces. Currently, the implicit bounds of a unit box range from negative one half to positive one half in the X (left to right) and Y (bottom to top) dimensions, and from zero to one in Z (coming out of the screen).

The fundamental operations performed on unit boxes are tests for containment of points and other boxes, plus computation of the unit box representing one unit box in the coordinate system of another.

C. Camera

The only fundamental data stored in a camera object in this system is its position (called the "eye point") within the unit box of some current graphical topic's unit box. This plus a description of a destination display surface defines the essential features of a display context.

The fundamental operations on camera objects are:

1. The ability to move the eye point (with constraints to restrict it within legal bounds),
2. The ability to map between relative modeling coordinates and screen coordinates, and
3. The ability to smoothly animate (interpolate) the eye point from one point to another.

Each time a camera moves forward within the space of a current topic, a test is made to see whether it has entered one of that topic's children's sub-spaces. Likewise, each time a camera backs up, a test is made to see whether it has backed out of a sub topic and returned to a parent topic. Either of these cases triggers a change of context. The position of the camera is then reset to be last position of the camera as expressed within the coordinate system of the new current topic, and navigation continues within that new context.

The volume of space displayed at any time is the cube with edge length equal to the distance from the camera to the back wall of the current topic's space, and centered half way from the camera's eye point to that back wall. A little extra space either horizontally or vertically may also be displayed beyond the bounds of that cube to account for non-square display surfaces. All child nodes within that volume are displayed, as are their descendants down to some maximum number of levels depending on desired display density and rendering time allowed. This automatic scaling of the camera volume proportional to its relative depth is one of the key features of the system.

We claim:

1. A system for displaying information, comprising:
   a) an information structure having a plurality of semantic entities, each semantic entity having:
      (1) a navigable link to at least one other semantic entity;
      (2) a graphic object for representing the semantic entity on a display screen;
   b) a display window having a variably resizable display area, and a selected information density; and
   c) a display engine that displays graphics objects of a selected number of semantic entities, the semantic entities selected from the information structure in accordance with the selected information density.

2. The system of claim 1, wherein each graphic object is capable of being displayed at any of a plurality of sizes.

3. The system of claim 2, wherein the size of each displayed graphic object is determined in accordance with the selected information density of the display screen.

4. The system of claim 3 wherein the information density is a constant and the size of each graphic object is a function of at least the information density.

5. The system of claim 1 wherein the information density is a constant and the number of semantic entities selected is a unction of at least the information density.

6. A method for displaying semantic information in the form of graphic objects, comprising:
   a) storing an information structure having a plurality of semantic entities, each semantic entity having:
      (1) a navigable link to a plurality of other semantic entities; and
      (2) a graphic object for representing the semantic entity on a display screen, each graphic object capable of being displayed at any of a plurality of sizes, and having a shape;
   b) displaying a first graphic object of a first semantic entity;
   c) displaying within the shape of the first graphic object the graphic objects of each semantic entity linked to the first semantic entity; and
   d) dynamically scaling the size of the displayed graphic objects to maintain a selected information density of displayed data.

7. The method of claim 6 wherein the information density is a constant and the size of each graphic object is a function of at least the information density.

8. A method for displaying semantic information in the form of graphic objects in a display window, comprising:

a) storing an information structure having a plurality of semantic entities, each semantic entity having:
   (1) a navigable link to a plurality of other semantic entities; and
   (2) a graphic object for representing the semantic entity on a display screen,
      wherein selected ones of semantic entities semantically contain at least one other semantic entity;
b) displaying in the display window first graphic objects of a plurality of first semantic entities from the information structure, the display window having a variably resizable display area and a selected information density;
c) displaying a cursor in the display window;
d) receiving a user input to move the cursor toward at least one of the displayed first graphic objects;
e) simulating movement toward a first displayed graphic object by:
   (1) increasing the size of the displayed first graphic objects; and
   (2) displaying second graphic objects of second semantic entities contained by the first semantic entities;
      wherein the size of the displayed graphic objects is determined in accordance with the selected information density of the display window.

9. The method of claim 8 wherein the information density is a constant and the size of each graphic object is a function of at least the information density.

10. A method for displaying semantic information in the form of graphic objects in a display window, comprising:

a) storing an information structure having:
   (1) a plurality of levels of semantic containment, each level of semantic containment having:
      (a) a plurality of semantic entities, each semantic entity having:
         i) a navigable link to a plurality of other semantic entities;
         ii) a graphic object for representing the semantic entity on a display screen;
      such that each semantic entity either semantically contains at least one other semantic entity, is or semantically contained by at least one other semantic entity;
b) displaying in the display window graphic objects of at least one semantic entity from an Nth level from the information structure, the display window having a variably resizable display area and a selected information density;
c) for each semantic entity from the Nth level that is displayed, displaying in the window the graphic objects of the semantic entities at the (N+1) level that are semantically contained by the semantic entity from the Nth level;
d) displaying a cursor in the display window;
e) receiving a user input to move the cursor toward at least one of the displayed graphic objects for a semantic entity from the (N+1)th level;
f) simulating movement toward a displayed graphic object of a semantic entity from the (N+1)th level by:
   (1) increasing the size of the displayed graphic objects of the semantic entities from the (N+1)th level; and
   (2) displaying graphic objects of semantic entities at a (N+2)th level contained by the semantic entities from the (N+1)th level;
      wherein size of the displayed graphic objects is determined in accordance with the selected information density of the display window.

11. The method of claim 10 wherein the information density is a constant and the size of each graphic object is a function of at least the information density.

* * * * *